(12) United States Patent
Patil et al.

(10) Patent No.: US 11,930,503 B2
(45) Date of Patent: Mar. 12, 2024

(54) SYSTEMS FOR COMMUNICATING WITH UNASSOCIATED STATIONS

(71) Applicant: QUALCOMM Incorporated, San Diego, CA (US)

(72) Inventors: Abhishek Pramod Patil, San Diego, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 17/338,114

(22) Filed: Jun. 3, 2021

(65) Prior Publication Data

US 2021/0298059 A1    Sep. 23, 2021

Related U.S. Application Data

(63) Continuation of application No. 16/224,748, filed on Dec. 18, 2018, now Pat. No. 11,057,922.

(Continued)

(51) Int. Cl.
*H04W 72/23* (2023.01)
*H04W 72/12* (2023.01)
(Continued)

(52) U.S. Cl.
CPC .......... *H04W 72/23* (2023.01); *H04W 72/12* (2013.01); *H04W 74/008* (2013.01);
(Continued)

(58) Field of Classification Search
None
See application file for complete search history.

(56) References Cited

U.S. PATENT DOCUMENTS 9,277,399 B2   3/2016   Cherian et al.
9,894,641 B2   2/2018   Ding et al.
(Continued)

FOREIGN PATENT DOCUMENTS

CN          102696182 A      9/2012
WO       WO-2014130660       8/2014
(Continued)

OTHER PUBLICATIONS

Gan (Huawei) Ming., et al., "Association Exchange using Contention based UL OFDMA", IEEE Draft, 802.11-17/0396 r3, 11-17-0396-03-00AX-ASSOCIATION-EXCHANGE-USING_CONTENTION-BASED-UL-OFDMA, IEEE-SA Mentor, Piscataway, NJ, USA, vol. 802.11ax, No. 3, Mar. 16, 2017, pp. 1-15, XP068115496, Mar. 1, 2017, Retrieved from the Internet: URL: https://mentor.ieee.org/802.11/dcn/17/11-17-0396-03-00ax-association-exchange-using-contention-based-ul-ofdma.pptx [retrieved on Mar. 16, 2017] the whole document.

(Continued)

*Primary Examiner* — Alex Skripnikov
(74) *Attorney, Agent, or Firm* — Arun Swain

(57) ABSTRACT

Methods and apparatus for communicating in a wireless network. In one aspect, a first wireless communication device may generate a first frame that includes at least a first aggregated media access control protocol data unit (A-MPDU). The first A-MPDU may include one or more media access control protocol data units (MPDUs). The first wireless communication device may set a first recipient address (RA) field to a first value in a first MPDU, and set a first field in the first MPDU to a second value that represents an identifier of a second wireless communication device. In one aspect, the first wireless communication device may set a second field in the first MPDU to a third value that represents an identifier of a third wireless com- (Continued)

munication device. The wireless communication device may output the first frame for transmission to at least the second and third wireless communication devices.

20 Claims, 17 Drawing Sheets

Related U.S. Application Data

(60) Provisional application No. 62/608,371, filed on Dec. 20, 2017.

(51) Int. Cl.
*H04W 74/00* (2009.01)
*H04W 74/08* (2009.01)
*H04W 84/12* (2009.01)

(52) U.S. Cl.
CPC ....... *H04W 74/08* (2013.01); *H04W 74/0833* (2013.01); *H04W 84/12* (2013.01)

(56) References Cited

U.S. PATENT DOCUMENTS

| | | | |
|---|---|---|---|
| 9,948,367 B2 | 4/2018 | Abraham et al. |
| 10,135,957 B2 | 11/2018 | Asterjadhi et al. |
| 10,149,284 B2 | 12/2018 | Tian et al. |
| 10,499,418 B2 | 12/2019 | Merlin et al. |
| 11,057,922 B2 | 7/2021 | Patil et al. |
| 2003/0185241 A1 | 10/2003 | Lu et al. |
| 2015/0382333 A1 | 12/2015 | Seok |
| 2016/0269296 A1 | 9/2016 | Abraham |
| 2016/0302229 A1 | 10/2016 | Hedayat |
| 2017/0289994 A1 | 10/2017 | Kim et al. |
| 2018/0027561 A1 | 1/2018 | Segev et al. |
| 2020/0092881 A1 | 3/2020 | Nezou et al. |

FOREIGN PATENT DOCUMENTS

| | | | |
|---|---|---|---|
| WO | WO-2016007770 | | 1/2016 |
| WO | WO-2016049530 | | 3/2016 |
| WO | WO-2016073477 | | 5/2016 |
| WO | WO-2016126833 | | 8/2016 |
| WO | WO-2016144559 A2 | | 9/2016 |
| WO | WO-2016205220 A2 | | 12/2016 |
| WO | WO-2018193128 A1 * | 10/2018 | ........... H04L 5/0055 |

OTHER PUBLICATIONS

Gan (Huawei) Ming., et al., "Resolution for CID on Pre-Association", IEEE Draft, 11-17-0395-06-00AX-LB225-CR-ON-PRE-ASSOCIATION, IEEE P802.11 Wireless LANs, D1.06, IEEE-SA Mentor, Piscataway, NJ, USA, vol. 802.11ax, No. 6, Mar. 16, 2017 (Mar. 7, 2017), pp. 1-9, XP068115492, Jan. 2017.
International Search Report and Written Opinion—PCT/US2018/066495—ISA/EPO—dated Sep. 24, 2019.
Taiwan Search Report—TW107146001—TIPO—dated Sep. 16, 2021.

* cited by examiner

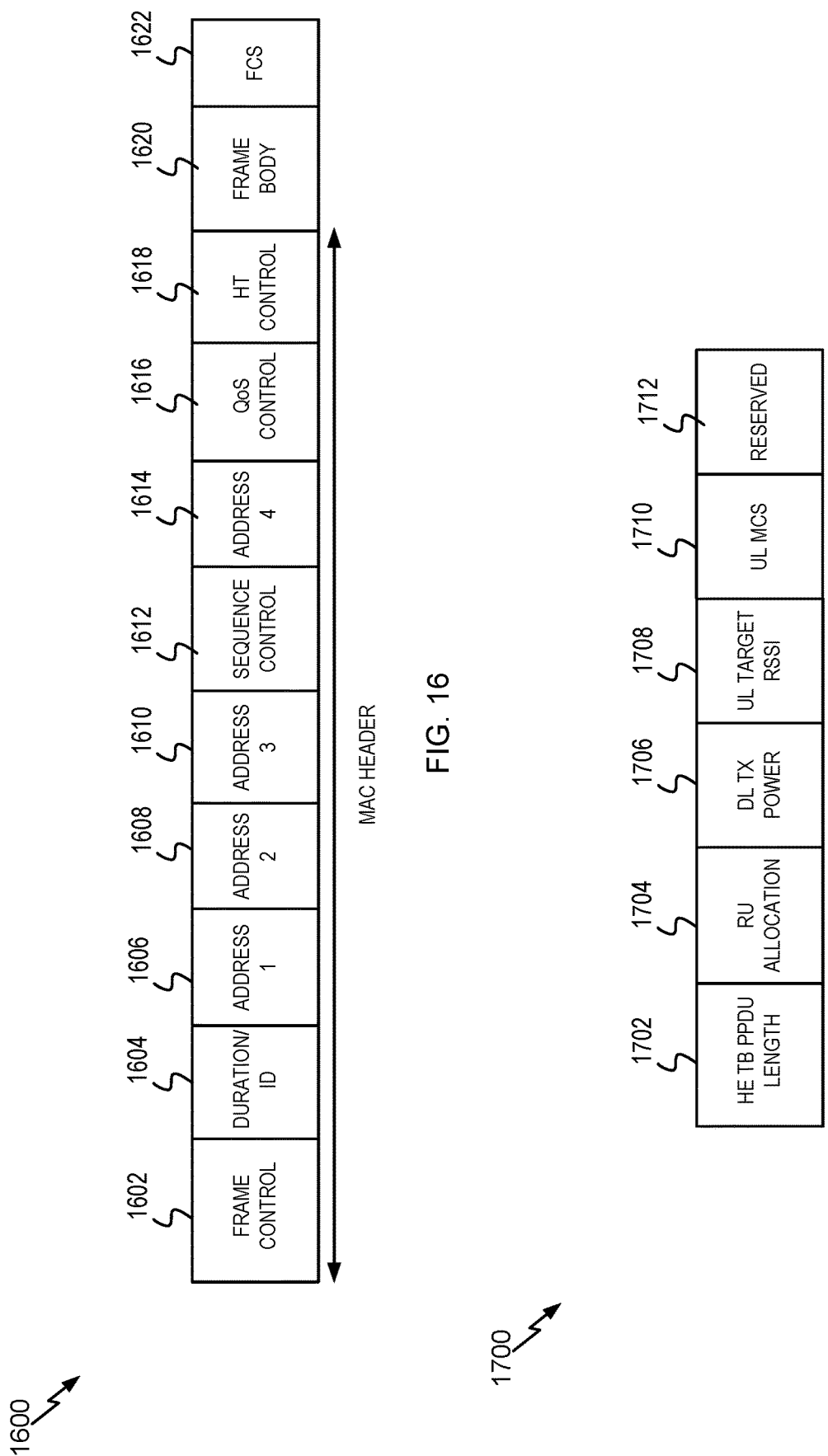

SYSTEMS FOR COMMUNICATING WITH UNASSOCIATED STATIONS

CROSS-REFERENCE TO RELATED APPLICATIONS

This patent application is a Continuation of U.S. patent application Ser. No. 16/224,748, filed Dec. 18, 2018, entitled "SYSTEMS FOR COMMUNICATING WITH UNASSOCIATED STATIONS" which claims priority to U.S. Provisional Patent Application No. 62/608,371, filed Dec. 20, 2017, entitled "SYSTEMS FOR COMMUNICATING WITH UNASSOCIATED STATIONS," and assigned to the assignee hereof. The disclosures of the prior applications are considered part of and are incorporated by reference in this patent application.

TECHNICAL FIELD

This disclosure relates generally to wireless communications, and more specifically, to communicating with unassociated stations.

DESCRIPTION OF THE RELATED TECHNOLOGY

A wireless local area network (WLAN) may be formed by one or more access points (APs) that provide a shared wireless communication medium for use by one or more client devices, also referred to as stations (STAs). The basic building block of a WLAN conforming to the IEEE 802.11 family of standards is a Basic Service Set (BSS), which is managed by an AP that serves one or more STAs. Each BSS is identified by a service set identifier (SSID) that is advertised by the AP.

An AP periodically broadcasts beacon frames to enable any STAs within wireless range of the AP to establish and/or maintain a communication link with the WLAN. To identify an AP with which to associate, a STA may wait to receive a beacon frame from an AP or may be configured to perform active scans on the wireless channels of each of one or more frequency bands by sending one or more probe requests to elicit one or more probe responses from one or more APs. Using the information received in a beacon or a probe response, a STA may select an AP from one or more available APs within range of the STA. The STA may then associate with the selected AP and begin data communication through the AP after completion of the association process.

In some situations, an AP may send a communication that will be received by one or more STAs that are not already associated with the AP. The communication from the AP may be included in a single-user (SU) data unit directed to a single station, or a multi-user (MU) data unit directed to multiple stations. The use of an MU data unit for communicating with unassociated stations may introduce a few issues that could benefit from new ways to communicate between an AP and unassociated stations.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 16 is an example of a media access control (MAC) frame format.

FIG. 17 is an example of a triggered response scheduling (TRS) control field.

SUMMARY

Figure 1:
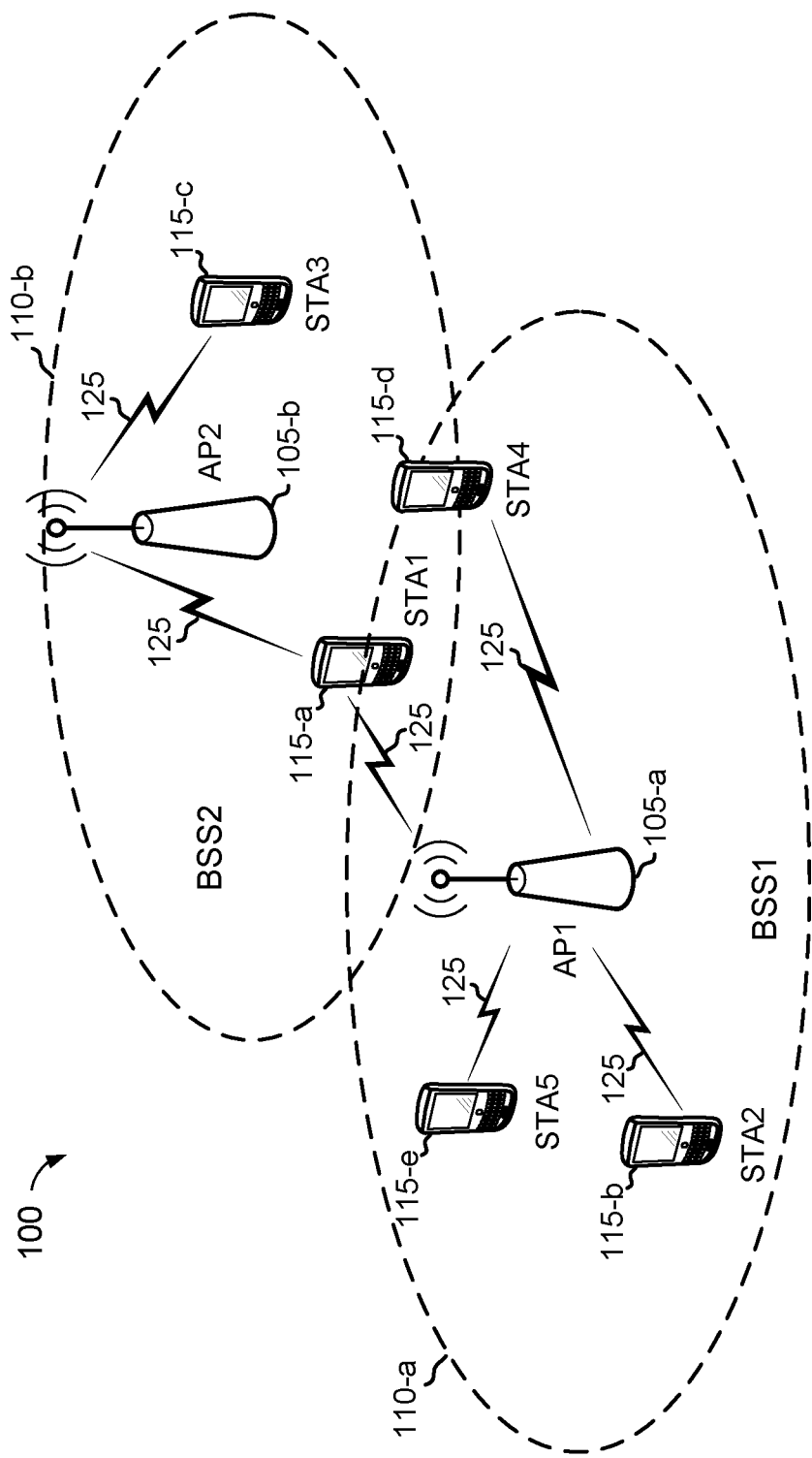
FIG. 1 is a diagram illustrating an example of a wireless local area network (WLAN) deployment.

The systems, methods and devices of this disclosure each have several innovative aspects, no single one of which is solely responsible for the desirable attributes disclosed herein.

One innovative aspect of the subject matter described in this disclosure can be implemented by a first wireless communication device. The first wireless communication device may generate a first frame that includes at least a first aggregated media access control protocol data unit (A-MPDU). The first A-MPDU may include one or more media access control protocol data units (MPDUs). The first wireless communication device may set a first recipient address (RA) field to a first value in a first MPDU of the one or more MPDUs in the first A-MPDU. The first wireless communication device may set a first field in the first MPDU to a second value. The first wireless communication device may output the first frame for transmission to at least a second wireless communication device.

In some implementations, the first wireless communication device may set the first field to the second value that represents an identifier of the second wireless communication device. The first wireless communication device also may set a second field in the first MPDU to a third value, different than the second value, that represents an identifier of a third wireless communication device. The first wireless communication device may output the first frame for transmission to at least the second and third wireless communication devices.

In some implementations, the first frame may be a Multi-Station (Multi-STA) BlockAck (BA) frame. The first wireless communication device setting the first RA field may include setting the first RA field to a broadcast address. The first wireless communication device setting the first field may include setting a first RA subfield of the first field to a first media access control (MAC) address associated with the second wireless communication device. The first wireless communication device setting the second field may include setting a second RA subfield of the second field to a second MAC address associated with the third wireless communication device.

In some implementations, the first frame may be included in a resource unit of a downlink (DL) multi-user (MU) PPDU having a station identification (STA ID) field set to a value of 2045, which may indicate a broadcast communication with one or more unassociated wireless communication devices.

Another innovative aspect of the subject matter described in this disclosure can be implemented by a second wireless communication device. The second wireless communication device may receive a first frame, from a first wireless communication device, that includes at least a first A-MPDU. The first A-MPDU may include one or more MPDUs. The second wireless communication device may decode at least a portion of a first MPDU of the one or more MPDUs in the first A-MPDU. The second wireless communication device may identify a first RA field in the first MPDU, the first RA field of the first MPDU including a first value. The second wireless communication device may determine whether a first field in the first MPDU is addressed to the second wireless communication device or a different wireless communication device, in response to the first RA field including the first value.

Another innovative aspect of the subject matter described in this disclosure can be implemented by a wireless communication apparatus of a first wireless communication device. The wireless communication apparatus may include a processor and a transmitter. The processor may be configured to generate a first frame that includes at least a first A-MPDU. The first A-MPDU may include one or more MPDUs. The processor may be configured to set a first RA field to a first value in the one or more MPDUs in the first A-MPDU, and set a first field in the first MPDU to a second value. The transmitter may be coupled with the processor, and the transmitter may be configured to output the first frame for transmission to at least a second wireless communication device.

Another innovative aspect of the subject matter described in this disclosure can be implemented by a wireless communication apparatus of a second wireless communication device. The wireless communication apparatus may include a receiver and a processor. The receiver may be configured to receive a first frame, from a first wireless communication device, that includes at least a first A-MPDU. The first A-MPDU may include one or more MPDUs. The processor may be coupled with the receiver, and the processor may be configured to decode at least a portion of a first MPDU of the one or more MPDUs in the first A-MPDU. The processor may be configured to identify a first RA field in the first MPDU, the first RA field of the first MPDU including a first value. The processor may be configured to determine whether a first field in the first MPDU is addressed to the second wireless communication device or a different wireless communication device, in response to the first RA field including the first value.

Another innovative aspect of the subject matter described in this disclosure can be implemented by a wireless communication apparatus. The wireless communication apparatus may include means for receiving a first frame, by a second wireless communication device from a first wireless communication device, that includes at least a first A-MPDU. The first A-MPDU may include one or more MPDUs. The wireless communication apparatus may include means for decoding at least a portion of a first MPDU of the one or more MPDUs in the first A-MPDU, means for identifying a first RA field in the first MPDU, the first RA field of the first MPDU including a first value, and means for determining whether a first field in the first MPDU is addressed to the second wireless communication device or a different wireless communication device, in response to the first RA field including the first value.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The systems and techniques described in this detailed description provide various mechanisms for communicating between a first communication device and one or more other communication devices. These mechanisms may be helpful for enabling communications between an access point (AP) and stations (STAs) that are not already associated with the AP. As one example, an IEEE 802.11ax AP may send a trigger frame (e.g., the trigger frame 200 of FIG. 2) that allocates one or more resource units (RUs) for random access communications by STAs that are not currently associated with the AP. An RU may be a sub-channel, within a larger channel bandwidth, that includes a subset of the channel's total available subcarriers. For example, in IEEE 802.11ax, an RU may be a group of 26, 52, 106, 242, 484, or 996 subcarriers (or tones). The RUs may be used by one or more STAs, such as in an orthogonal frequency-division multiple access (OFDMA) system.

After identifying an RU that is allocated for random access communications by unassociated STAs, an unassociated STA may elect to use the allocated RU to send a frame (e.g., a management frame, such as a probe request or association request) to the AP. Multiple unassociated STAs may elect to send a frame to the AP in response to the AP's trigger frame. In some situations, the AP may respond (e.g., send a probe response or association response) to each of these multiple unassociated STAs by sending a single-user (SU) physical layer conformance procedure (PLCP) protocol data unit (PPDU) to each individual STA (which results in multiple SU PPDUs being sent by the AP). In other situations, the AP may try to respond to the multiple unassociated STAs by sending a downlink (DL) multi-user (MU) PPDU. In some situations, the use of the MU PPDU may reduce the number of data units sent by the AP to service the uplink trigger-based messages from the unassociated STAs. The use of an MU PPDU for communicating with unassociated stations may introduce a few issues that could benefit from new ways to communicate between an AP and unassociated stations.

To overcome a first potential issue, a new way to address multiple unassociated stations (e.g., via multiple media access control protocol data unit (MPDUs)) inside of a single aggregated MPDU (A-MPDU) within an MU PPDU may be beneficial in some implementations. An 802.11ax AP may send a downlink MU PPDU having a station identification (STA ID) field set to indicate a broadcast RU for unassociated STAs (e.g., the RU is intended for more than one unassociated STA). The AP may send an A-MPDU on this RU to communicate with multiple different STAs. However, section 9.7.3 of the 802.11-2016 standard states that "[a]ll of the MPDUs within an A-MPDU are addressed to the same RA." The phrase "the same RA" indicates that the same recipient address (RA) value, which is used to identify the station at which the MPDU is directed, should be used in each MPDU within a single A-MPDU. Therefore, when following this rule, all the MPDUs in the A-MPDU would need to be sent to the same recipient address, which could undermine the ability for some implementations to allow an RU to carry an A-MPDU containing MPDUs intended for more than one STA.

To overcome a second potential issue, a new way to receive further communications (e.g., other than the initial uplink management frame sent in response to the trigger frame) from an unassociated STA at an AP may be beneficial in some implementations. Some implementations of 802.11ax may only allow an unassociated STA to send management frames (e.g., a probe request) using random access communications in response to a trigger frame allocating an RU for unassociated STAs. These implementations of 802.11ax may also limit the AP's response, when responding in a downlink MU PPDU, to only send a management frame (e.g., a probe response). In such implementations, the AP may not be able to solicit an immediate response to its downlink response. For example, an unassociated STA may not have an RU allocated and available for an uplink response message to acknowledge receipt of the downlink MU PPDU (e.g., to acknowledge receipt of a probe response contained within the MU PPDU).

To overcome a third potential issue, a new way to determine whether a STA should process a transmission from an AP containing an RU allocated for unassociated STAs may be beneficial in some implementations. Some implementations of 802.11ax may not specify which unassociated STA(s) are addressed by the AP in the RU allocated for communication with unassociated STAs. For example, some downlink frames may not identify that the frames are only meant for certain unassociated STAs and that other unassociated STAs can ignore these frames. In these situations, all unassociated STAs in the area of the AP may attempt to decode and process a transmission from the AP containing an RU allocated for communications with unassociated STAs. Unassociated STAs that did not previously send a message to the AP in response to the AP's trigger frame may unnecessarily waste processing cycles or battery power to process these incoming frames.

Various solutions to these potential issues will be discussed in more detail below, such as in the descriptions below related to FIGS. 5-20. In some implementations, the AP may send a DL MU PPDU that is directed to all unassociated STAs, having the recipient address (RA) field set to a broadcast address. The AP also may send a DL MU PPDU that is a Multi-STA BlockAck (BA) frame type and is directed to one or more unassociated STAs. The DL MU PPDU may have the RA field set to a broadcast address, and may include RA information for the one or more unassociated STAs in one of the BA fields of the Multi-STA BA frame. The AP also may send a DL MU PPDU that is directed to a single unassociated STA, having the RA field set to an address (such as a media access control (MAC) address) of the unassociated STA. Additional types of DL MU PPDUs are also described here, such as a DL MU PPDU having at least a first MPDU and a second MPDU, where the first MPDU includes a first field having a first value that represents an identifier of a first unassociated STA, and the second MPDU includes a second field having a second value that represents an identifier of a second unassociated STA. Also, note that although several of the solutions and implementations described herein are discussed in the context of communication with an unassociated STA or a group of unassociated STAs, these same solutions and implementations can also be used for communication with a STA or a group of STAs that are already associated with the AP.

FIG. 1 is a wireless communication system 100 illustrating an example of a wireless local area network (WLAN) deployment in connection with various techniques described herein for a first device (e.g., an AP) to provide additional communication characteristics regarding its operation to other devices (e.g., STAs.) The WLAN deployment may include one or more access points (APs) and one or more wireless stations (STAs) associated with a respective AP. In this example, there are two APs deployed for illustrative purposes: AP1 105-*a* in basic service set 1 (BSS1) and AP2 105-*b* in BSS2. BSS1 and BSS2 may be identified by different BSS color indicators in communications to allow receiving devices to differentiate the source BSS of a communication according to which BSS color indicator is included in the communication. AP1 105-*a* is shown having multiple associated STAs (STA1 115-*a*, STA2 115-*b*, STA4 115-*d*, and STA5 115-*e*) and coverage area 110-*a*, while AP2 105-*b* is shown having multiple associated STAs (STA1 115-*a* and STA3 115-*c*) and coverage area 110-*b*. In the example of FIG. 1, the coverage area of AP1 105-*a* overlaps part of the coverage area of AP2 105-*b* such that STA1 115-*a* is within the overlapping portion of the coverage areas. The number of BSSs, APs, and STAs, and the coverage areas of the APs described in connection with the WLAN deployment of FIG. 1 are provided by way of illustration and not of limitation. Moreover, aspects of the various techniques described herein are at least partially based on the example WLAN deployment of FIG. 1 but need not be so limited.

The APs (e.g., AP1 105-*a* and AP2 105-*b*) shown in FIG. 1 are generally fixed terminals that provide backhaul services to STAs within its coverage area or region. In some applications, however, the AP may be a mobile or non-fixed terminal. The AP may also be a STA, such as a STA operating in an AP role. The STAs (e.g., STA1 115-*a*, STA2 115-*b*, STA3 115-*c*, STA4 115-*d*, and STA5 115-*e*) shown in FIG. 1, which may be fixed, non-fixed, or mobile terminals, utilize the backhaul services of their respective AP to connect to a network (see, e.g., network 318 in FIGS. 3 and 4), such as the Internet. Examples of a STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. A STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, a small cell, or any other suitable terminology. The various concepts described throughout this disclosure are intended to apply to all suitable wireless apparatus regardless of their specific nomenclature.

Each of STA1 115-*a*, STA2 115-*b*, STA3 115-*c*, STA4 115-*d*, and STA5 115-*e* may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-*a* and AP2 105-*b* can include software applications and/or circuitry to enable associated STAs to connect to a network via communications links 125. The APs can send frames to their respective STAs and receive frames from their respective STAs to communicate data and/or control information (e.g., signaling).

Each of AP1 105-*a* and AP2 105-*b* can establish a communications link 125 with a STA that is within the coverage area of the AP. Communications links 125 can comprise communications channels that can enable both uplink and downlink communications. When connecting to an AP, a STA can first authenticate itself with the AP and then associate itself with the AP. Once associated, a communications link 125 can be established between the AP and the STA such that the AP and the associated STA can exchange frames or messages through a direct communications channel.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN, and other technologies used in wide area networks (WANs), cellular networks, WLANs, personal area networks (PAN)s, or other suitable networks now known or later developed.

Figure 2:
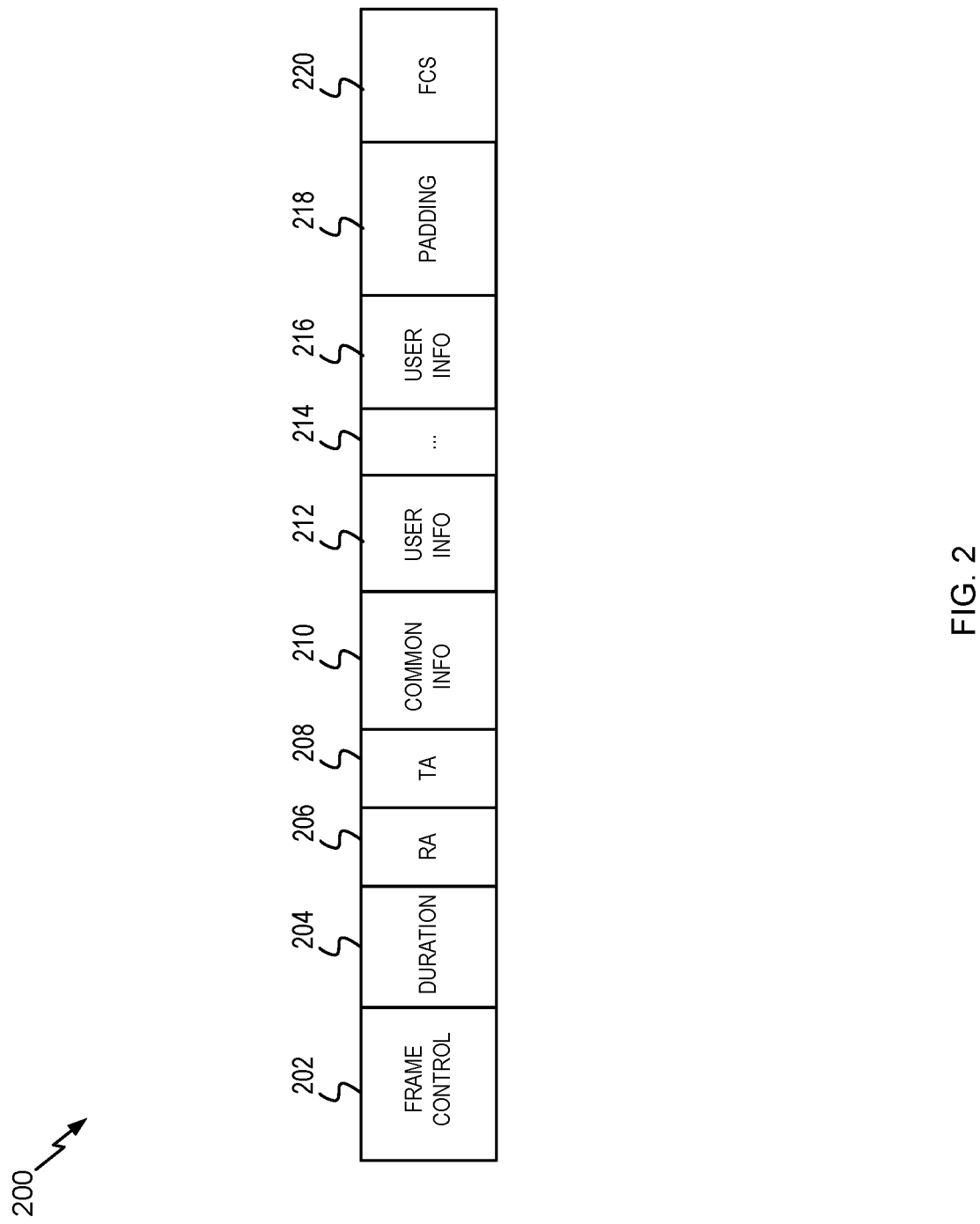
FIG. 2 is an example of a trigger frame.

FIG. 2 illustrates an example of a trigger frame 200. An AP may send a trigger frame 200 to provide a transmission schedule to STAs. For example, the trigger frame 200 may specify which STAs can transmit during certain times and which subsets of orthogonal frequency-division multiple access (OFDMA) sub-carriers they will use. The trigger frame 200 solicits and allocates resources for uplink (UL) transmissions (including multi-user (MU) transmissions) scheduled after the Physical Layer Convergence Procedure (PLCP) protocol data unit (PPDU) that carries the trigger frame 200. The trigger frame 200 carries information used by the responding STA to send a trigger-based (TB) PPDU back to the AP. In one implementation, the trigger frame 200 may include a frame control field 202, a duration field 204, a recipient address (RA) field 206, a transmitter address (TA) field 208, a common information field 210, one or more user information fields 212, 214, and 216 (where field 214 represents zero or more additional user information fields), padding 218, and a frame check sequence (FCS) field 220.

As will be discussed in more detail below in connection with FIGS. 5-20, the systems described herein may use the trigger frame 200 to allocate an RU for random access communications between an AP and unassociated STAs. A receiving STA that is unassociated with the AP may then send a trigger-based message back to the AP that sent the trigger frame 200. The trigger-based message may then result in further communications between the AP and the unassociated STA that sent the trigger-based message, as will be discussed further below.

Figure 3:
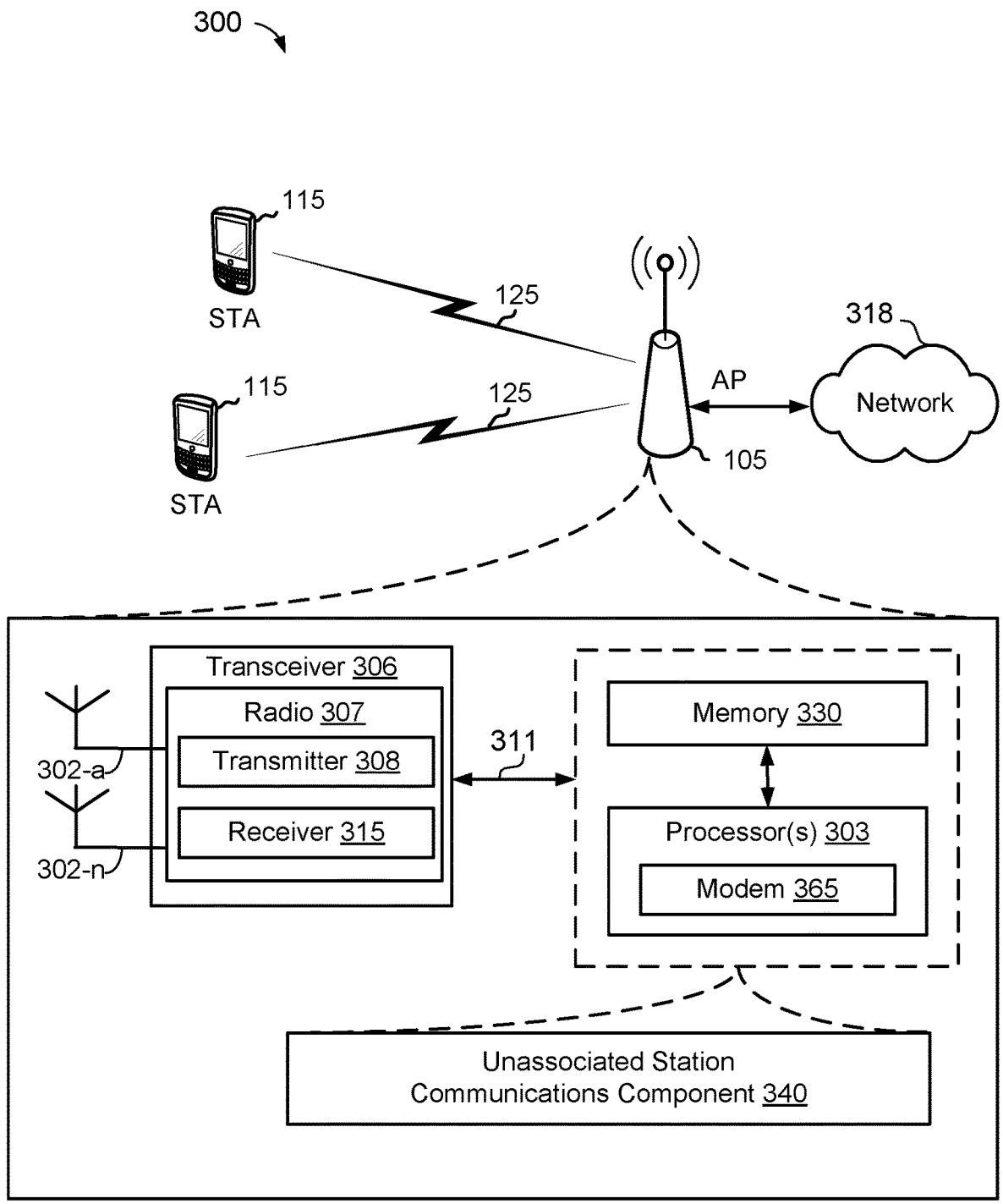
FIG. 3 is a diagram of a communication network including aspects of an AP configured for communicating with unassociated STAs in accordance with various aspects of the present disclosure.

FIG. 3 illustrates an example wireless communication system 300 that includes multiple STAs 115 in wireless communication with at least one AP 105 connected to network 318. The STAs 115 may communicate with network 318 via AP 105. In an example, STAs 115 may transmit and/or receive wireless communication to and/or from AP 105 via one or more communication links 125. Such wireless communications may include, but are not limited to, data, audio and/or video information. In some instances, such wireless communications may include control or similar information. An AP, such as AP 105, may be configured to perform the techniques related to communications between the AP and unassociated stations as described herein (see, e.g., FIGS. 5-20).

In accordance with the present disclosure, AP 105 may include a memory 330, one or more processors 303 and a transceiver 306. The memory 330, the one or more processors 303 and the transceiver 306 may communicate internally via a bus 311. In some examples, the memory 330 and the one or more processors 303 may be part of the same hardware component (e.g., may be part of a same board, module, or integrated circuit). Alternatively, the memory 330 and the one or more processors 303 may be separate components that may act in conjunction with one another. The bus 311 may be a communication system that transfers data between multiple components and subcomponents of the AP 105. In some examples, the one or more processors 303 may include any one or combination of modem processor, baseband processor, digital signal processor, and/or transmit processor. The one or more processors 303 may include a modem 365. The AP 105 includes an unassociated station communications component 340 for carrying out one or more methods or procedures described herein in connection with an AP. The unassociated station communications component 340 may comprise hardware, firmware, and/or software and may be configured to execute code or perform instructions stored in a memory (e.g., a computer-readable storage medium). For example, the unassociated station communications component 340 may be implemented by the processor 303 executing instructions stored on memory 330.

In some examples, the memory 330 may be configured for storing data that is used in connection with local applications, and/or in connection with the unassociated station communications component 340 and/or one or more of any subcomponents being executed by the one or more processors 303. Memory 330 can include any type of computer-readable medium usable by a computer or processor 303, such as random access memory (RAM), read only memory (ROM), tapes, magnetic discs, optical discs, volatile memory, non-volatile memory, and any combination thereof. In an aspect, for example, memory 330 may be a computer-readable storage medium (e.g., a non-transitory medium) that stores computer-executable code. The computer-executable code may define one or more operations or functions of the unassociated station communications component 340 and/or one or more of any subcomponents, and/or data associated therewith. The computer-executable code may define these one or more operations or functions when AP 105 is using processor 303 to execute the unassociated station communications component 340 and/or one or more of any subcomponents. In some examples, the AP 105 may further include the transceiver 306 for transmitting and/or receiving one or more data and control signals (e.g., messages) to/from a STA. For example, the AP 105 may transmit trigger frames, probe responses, broadcast probe responses, beacons, Fast Initial Link Setup (FILS) discovery frames, or other data or control frames. The transceiver 306 may comprise hardware, firmware, and/or software and may be configured to execute code or perform instructions stored in a memory (e.g., a computer-readable storage medium). The transceiver 306 may include one or more radios, including a radio 307 comprising a transmitter 308 and a receiver 315. The radio 307 may utilize one or more antennas 302 (e.g., antennas 302-a, . . . , 302-n) for transmitting signals to and receiving signals from a plurality of STAs. The receiver 315 may include one or more components that form a receiving chain and the transmitter 308 may include one or more components that form a transmitting chain.

The unassociated station communications component 340 may be configured to perform, alone or in combination with other components of the AP 105, at least any AP-side functions described in connection with the flow diagrams of FIGS. 5-11 and FIGS. 18-19.

Figure 4:
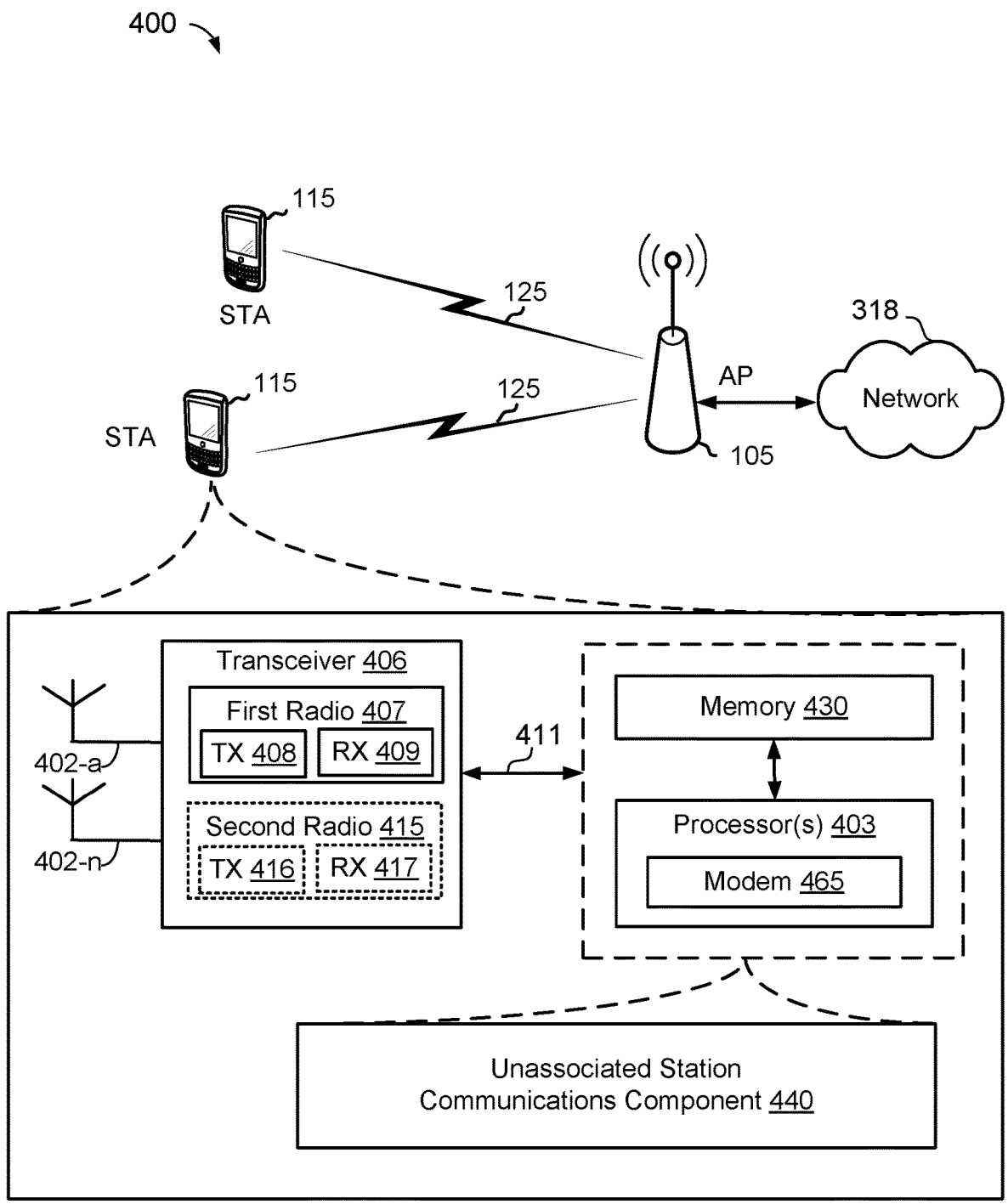
FIG. 4 is a diagram of a communication network including aspects of a STA configured for communicating with an AP in accordance with various aspects of the present disclosure.

FIG. 4 illustrates an example wireless communication system 400 similar to the wireless communication system 300 in FIG. 3. One or more of the STAs 115 may be configured to participate in the communication characteristic signaling process described herein.

In accordance with the present disclosure, a STA 115 may include a memory 430, one or more processors 403 and a transceiver 406. The memory 430, the one or more processors 403 and the transceiver 406 may communicate internally via a bus 411. In some examples, the memory 430 and the one or more processors 403 may be part of the same hardware component (e.g., may be part of a same board, module, or integrated circuit). Alternatively, the memory 430 and the one or more processors 403 may be separate components that may act in conjunction with one another. The bus 411 may be a communication system that transfers data between multiple components and subcomponents of the STA 115. In some examples, the one or more processors 403 may include any one or combination of modem processor, baseband processor, digital signal processor, and/or transmit processor. The one or more processors 403 may include a modem 465. The STA 115 includes an unassociated station communications component 440 for carrying out one or more methods or procedures described herein in connection with a STA. The unassociated station communications component 440 may comprise hardware, firmware, and/or software and may be configured to execute code or perform instructions stored in a memory (e.g., a computer-readable storage medium). For example, the unassociated station communications component 440 may be implemented by the processor 403 executing instructions stored on memory 430.

In some examples, the memory 430 may be configured for storing data that is used in connection with local applications, and/or in connection with the unassociated station communications component 440 and/or one or more of any subcomponents being executed by the one or more processors 403. Memory 430 can include any type of computer-readable medium usable by a computer or processor 403, such as random access memory (RAM), read only memory (ROM), tapes, magnetic discs, optical discs, volatile memory, non-volatile memory, and any combination thereof. In an aspect, for example, memory 430 may be a computer-readable storage medium (e.g., a non-transitory medium) that stores computer-executable code. The computer-executable code may define one or more operations or functions of the unassociated station communications component 440 and/or one or more of any subcomponents, and/or data associated therewith. The computer-executable code may define these one or more operations or functions when STA 115 is using processor 403 to execute the unassociated station communications component 440 and/or one or more of any subcomponents. In some examples, the STA 115 may further include the transceiver 406 for transmitting and/or receiving one or more data and control signals (e.g., messages) to/from a STA. The transceiver 406 may comprise hardware, firmware, and/or software and may be configured to execute code or perform instructions stored in a memory (e.g., a computer-readable storage medium). The transceiver 406 may include multiple radios that enable the STA 115 to operate as a multi-mode device or client. In this example, the transceiver 406 may include a first radio 407 having a transmitter (TX) 408 and a receiver (RX) 409, and a second radio 415 having a TX 416 and a RX 417. The first radio 407 may be a WLAN or Wi-Fi radio and the second radio 415 may be a non-WLAN system or non-Wi-Fi system radio (e.g., an LAA radio, an LTE-U radio).

Each of the first radio 407 and the second radio 415 may utilize one or more antennas 402 (e.g., antennas 402-a, . . . , 402-n) for transmitting signals to and receiving signals from an AP. The receivers 409 and 417 may include one or more components that form a receiving chain, and the transmitters 408 and 416 may include one or more components that form a transmitting chain.

The unassociated station communications component 440 may be configured to perform, alone or in combination with other components of the STA 115, at least the STA-side functions described in connection with the flow diagrams of FIGS. 5-11 and FIGS. 18-19.

Referring to FIGS. 5-11 and FIGS. 18-19, examples of one or more operations related to the AP 105 (FIG. 3) and the STA 115 (FIG. 4) are described with reference to one or more methods and one or more components. Although the operations described below are presented in a particular order and/or as being performed by an example component, it should be understood that the ordering of the actions and the components performing the actions may be varied, depending on the implementation. Moreover, it should be understood that the following actions may be performed by a specially-programmed processor, a processor executing specially-programmed software or computer-readable media, or by any other combination of a hardware component and/or a software component specially configured for performing the described actions or components. For example, the various steps shown in FIGS. 5-11 and FIGS. 18-19 may be performed by a processor (e.g., processor 303 for AP-side functions or processor 403 for STA-side functions) coupled with memory (e.g., memory 330 for AP-side functions or memory 430 for STA-side functions) that stores instructions executable by the processor to perform the described action. Other STA or AP sub-components may also be involved in each step, such as transceivers and antennas for any receive and/or transmit steps. Also, any steps described as being performed by an AP may alternatively be performed by a STA, such as a STA operating in an AP mode or in a STA-to-STA direct communication mode. Similarly, any steps described as being performed by a STA may alternatively be performed by an AP, such as an AP communicating with other APs or STAs.

Figure 5:
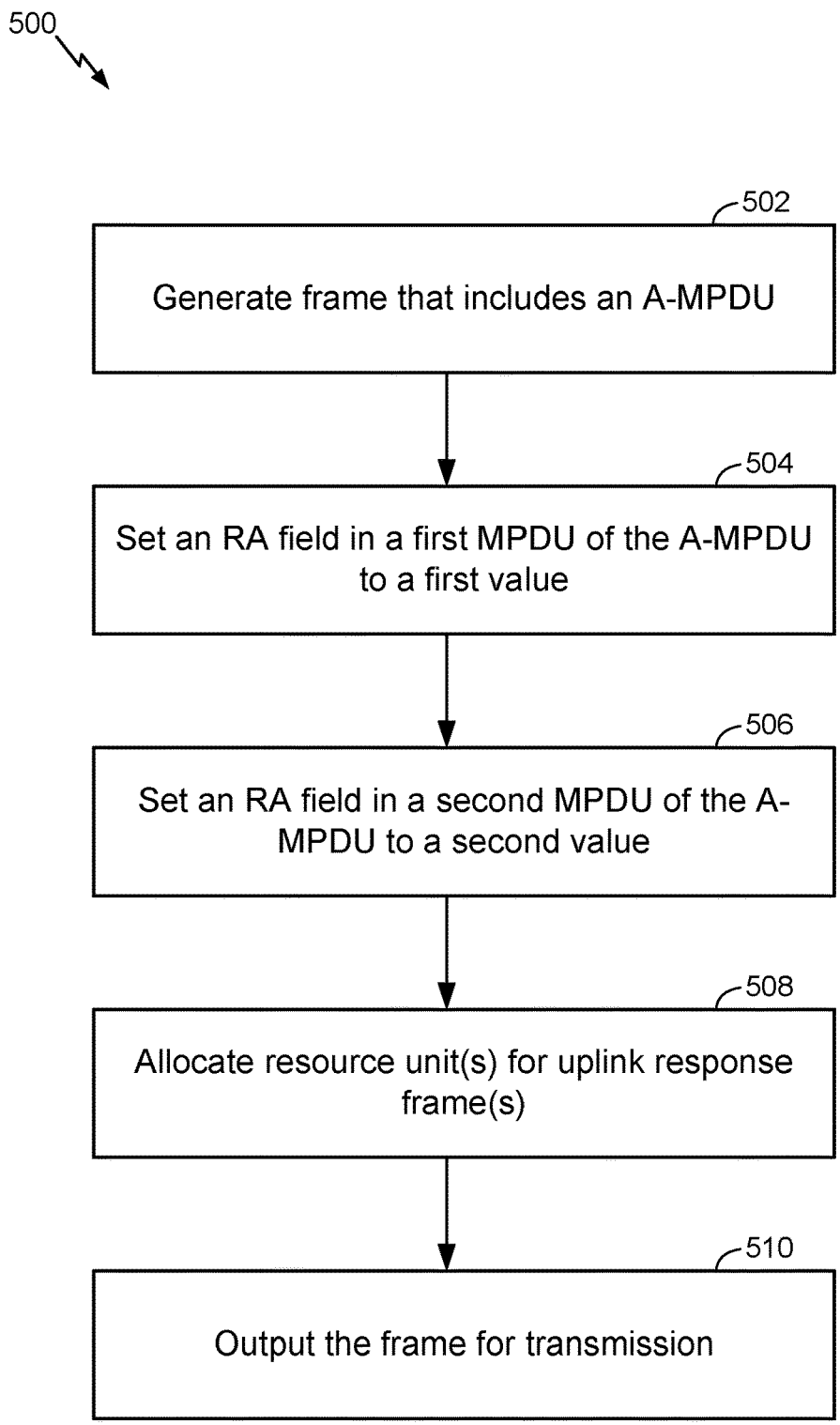
FIG. 5 is a flow diagram illustrating a first example of a technique for communicating with multiple different stations via an aggregated data unit.

FIG. 5 is a flow diagram illustrating an example of a process 500 for communicating with multiple different stations via an aggregated data unit (e.g., an A-MPDU), in accordance with various aspects of the present disclosure. In process 500, a wireless communication device, such as an AP (for responding to multiple STAs that sent trigger-based uplink messages) or a STA (for responding to other STAs and/or APs that sent trigger-based messages) generates a frame that includes an aggregated data unit. Note that for the remainder of the description of this flow diagram, an AP (e.g., AP 105 of FIG. 3) will be described as the wireless communication device sending the frame that includes the aggregated data unit, although the frame may be generated by a STA (e.g., STA 115 of FIG. 4) in other implementations.

In some implementations, process 500 begins at a point in the sequence when the AP has already (1) sent a trigger frame to multiple unassociated STAs allocating one or more RUs for random access communications; and (2) received multiple trigger-based messages from multiple unassociated STAs. Thus, process 500 starts when the AP determines that it will send a downlink response to the multiple trigger-based messages. At block 502, the AP generates a frame to respond to the multiple trigger-based messages from multiple unassociated STAs. Other implementations may use the techniques of FIG. 5 in other contexts. In the implementation of FIG. 5, the AP may determine that it will respond to the multiple STAs in a single downlink MU PPDU.

Figure 12:
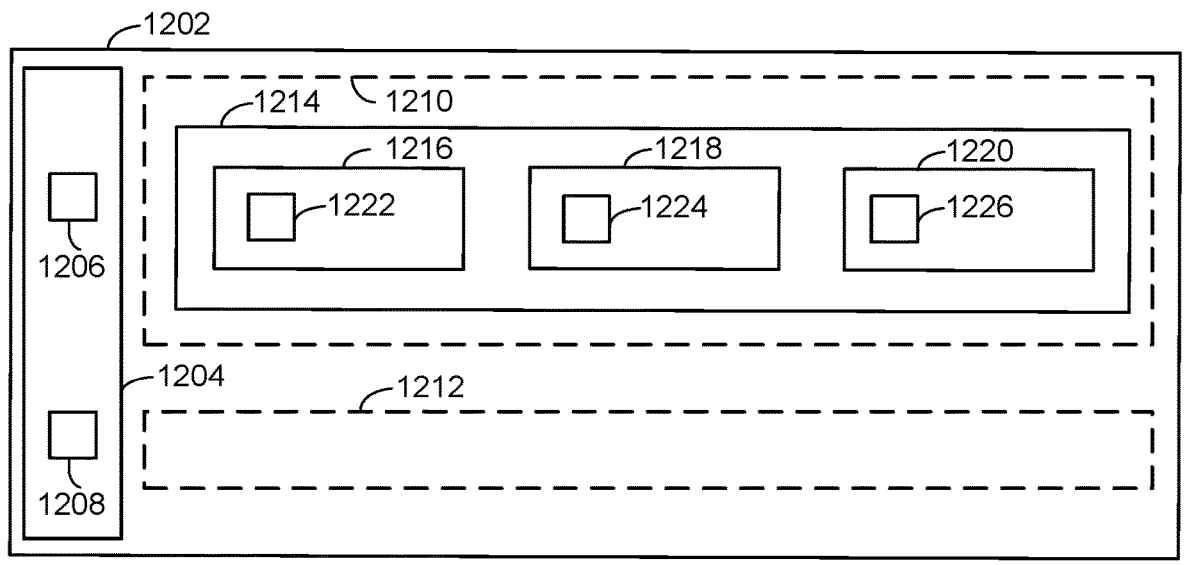
FIG. 12 is an example of a multi-user frame that includes an aggregated data unit.

FIG. 12 illustrates one example of an MU PPDU 1202 that may be used by the AP in process 500 to transmit multiple responses to the multiple received trigger-based messages from multiple unassociated STAs. The MU PPDU 1202 includes a header 1204. The header 1204 includes a number of different header fields, including header fields that provide an indication of the recipient of various data units included within the MU PPDU 1202 or an indication of the type of use (e.g., a broadcast to unassociated stations, a broadcast to associated stations, etc.) of a specific RU that will be used for a data unit included within the MU PPDU 1202. For example, the header 1204 may include an indication 1206 regarding the recipient or type of use of RU 1210 and an indication 1208 regarding the recipient or type of use of RU 1212.

The indications 1206 and 1208 may be located in a station identification portion of the header 1204 (e.g., a STA ID field). As a first example, when the AP sets the STA ID field to a value of 0, the AP is indicating broadcast (e.g., multi-recipient) communications with STAs that are already associated with the AP. As a second example, when the AP sets the STA ID field to a value of 2045, the AP is indicating broadcast (e.g., multi-recipient) communications with STAs that are unassociated with the AP. Although the value STA ID=2045 is used herein to indicate a situation where at least one resource unit is allocated for random access communications by STAs that are unassociated with the AP, values other than 2045 may instead be designated to indicate this situation in other implementations (such as if the IEEE 802.11ax standard, or later standards, changes which value signals this type of allocation). In a third example, when the AP sets the STA ID field to a specific value associated with a specific station, the AP is directing the communication to that specific station.

The MU PPDU 1202 may include multiple different frames to be carried on RUs. In the example of FIG. 12, the MU PPDU 1202 includes a first A-MPDU 1214 to be carried on RU 1210. Inside of the A-MPDU 1214 are multiple MPDUs 1216, 1218, and 1220. The MPDUs 1216, 1218, and 1220 each include a recipient address (RA) field 1222, 1224, and 1226 that indicates the intended recipient of the MPDU. The MU PPDU 1202 may also contain other frames. For example, the MU PPDU 1202 may also include a frame, such as an A-MPDU or MPDU, to be carried on RU 1212 (although this additional frame is not shown in FIG. 12). The MU PPDU may also contain one or more other frames (not shown) to be carried on or more other RUs (not shown).

Returning to block 502 of FIG. 5, the AP generates a frame that includes at least one A-MPDU that will be designated to communicate with multiple unassociated STAs (see, e.g., A-MPDU 1214 of FIG. 12). In this situation, the AP will set the STA ID indication 1206 to a special value (e.g., 2045) that indicates broadcast communication on RU 1210 with unassociated STAs. The RU 1210 will then be used to carry the A-MPDU 1214 to communicate with the multiple unassociated STAs. At block 504, the AP will set the RA field 1222 in a first MPDU 1216 of the A-MPDU 1214 to a first value that identifies a first STA that sent an uplink trigger-based message to the AP. At block 506, the AP will set the RA field 1224 in a second MPDU 1218 of the A-MPDU 1214 to a second value, different than the first value, that identifies a second STA that sent an uplink trigger-based message to the AP. The AP may also set the RA field for one or more other MPDUs of the A-MPDU 1214 to address other STAs, such as the RA field 1226 in the MPDU 1220 of FIG. 12. This implementation may be based on an exception to the current rules (see section 9.7.3 of the 802.11-2016 standard that "[a]ll of the MPDUs within an A-MPDU are addressed to the same RA") that would allow the AP to address different MPDUs within an A-MPDU to different STAs. This exception may be triggered for case where the STA ID for the RU is set to a special value (e.g., 2045) that indicates broadcast communications with unassociated STAs.

At block 508, the AP allocates one or more resource units to enable the STAs that will receive the messages included in the MPDUs 1216, 1218, and 1220 to send an uplink response message. The uplink response message may be an acknowledgement message acknowledging that the downlink MPDU was successfully received.

Figure 13:
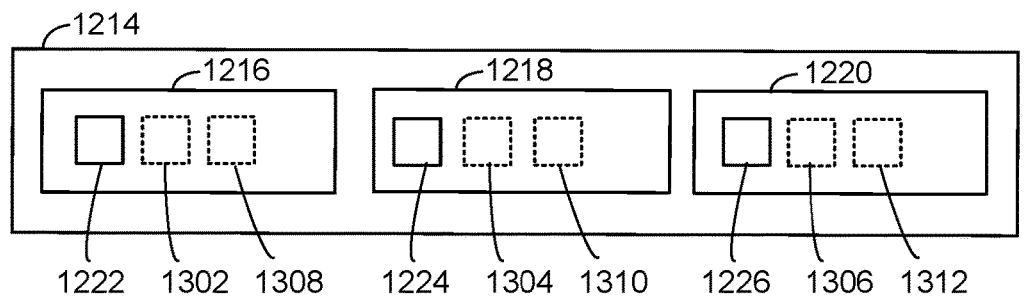
FIG. 13 is one example of the aggregated data unit of FIG. 12.

In a first implementation to allocate an RU for the uplink response message, the AP may include a triggered response scheduling (TRS) control field (which also may be referred to as an uplink multi-user response scheduling (UMRS) control field) of the MPDU to assign an RU to the STA to send an immediate response frame after receipt of the MPDU. For example, the TRS control field (or the UMRS control field) may be in the high efficiency (HE) control field of the MPDU. FIG. 13 illustrates one example of the A-MPDU 1214 of FIG. 12 that includes an optional TRS control field in one or more of the MPDUs of the A-MPDU. Specifically, FIG. 13 illustrates: (1) a TRS control field 1302 in MPDU 1216 to allocate an RU for an uplink response message from the STA identified in the RA field 1222 of the MPDU 1216; (2) a TRS control field 1304 in MPDU 1218 to allocate an RU for an uplink response message from the STA identified in the RA field 1224 of the MPDU 1218; and (3) a TRS control field 1306 in MPDU 1220 to allocate an RU for an uplink response message from the STA identified in the RA field 1226 of the MPDU 1220. FIG. 17 an example of an TRS control field 1700 usable within each of the MPDUs of the A-MPDU 1214 to allocate an RU for each receiving STA. In some implementations, the TRS control field 1700 may include a high efficiency (HE) trigger-based (TB) PPDU length field 1702, an RU allocation field 1704, a DL Tx power field 1706, an UL target received signal strength indicator (RSSI) 1708, an UL modulation coding scheme (MCS) field 1710, and reserved field(s) 1712. This implementation may be based on an exception to the general rule that all TRS control fields within an A-MPDU will have identical content. Rather, to enable this implementation, TRS control fields 1302, 1304, and 1306 will have different content to allocate potentially different RUs to potentially different STAs.

Figure 14:
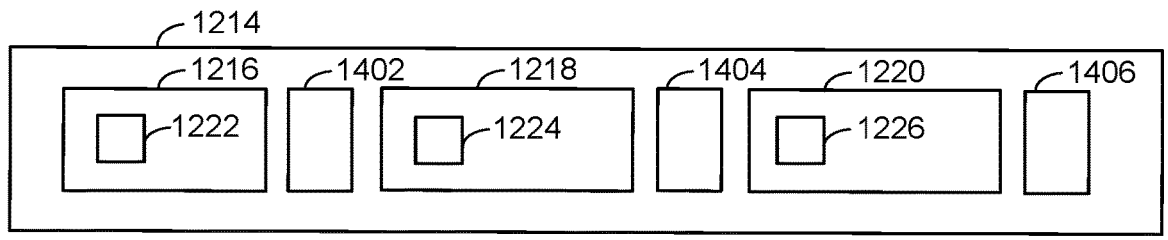
FIG. 14 is another example of the aggregated data unit of FIG. 12.

In a second implementation to allocate an RU for the uplink response message, the AP may aggregate one or more trigger frames within the A-MPDU that carries the MPDUs for the multiple unassociated STAs. Each trigger frame may allocate an RU for each STA to send its uplink response frame (e.g., acknowledgement of receipt of an MPDU) to the AP. FIG. 14 illustrates one example of the A-MPDU 1214 of FIG. 12 that includes one or more trigger frames 1402, 1404, and 1406 to allocate future uplink resources for the STAs that receive the A-MPDU 1214. Specifically, FIG. 14 illustrates: (1) a trigger frame 1402 positioned directly after MPDU 1216 to allocate an RU for an uplink response message from the STA identified in the RA field 1222 of the MPDU 1216; (2) a trigger frame 1404 positioned directly after MPDU 1218 to allocate an RU for an uplink response message from the STA identified in the RA field 1222 of the MPDU 1218; and (3) a trigger frame 1406 positioned directly after MPDU 1220 to allocate an RU for an uplink response message from the STA identified in the RA field 1222 of the MPDU 1220. FIG. 2 an example of trigger frame 200 usable within the A-MPDU 1214 to allocate an RU for a STA that receives the A-MPDU. This implementation may be based on an exception to the general rule that all trigger frames within an A-MPDU will have identical content. Rather, to enable this implementation, trigger frames 1402, 1404, and 1406 will have different content to allocate potentially different RUs to potentially different STAs.

In some implementations, unassociated STAs do not have an association identification (AID) assigned to them for communications with the AP (because they are currently unassociated). In these implementations, the AP may not be able to use a single trigger frame in the A-MPDU 1214 to assign RUs for all the STAs in the transaction. Thus, the implementation of FIG. 14 solves this potential issue by positioning the trigger frames 1402, 1404, and 1406 at locations within the A-MPDU 1214 that would allow a receiving STA to determine the intended recipient of the trigger frame by proximity to other frames that do identify a specific STA. For example, a receiving STA would process MPDU 1216 and determine that the RA field 1222 indicates that MPDU 1216 is intended for a specific STA. Based on the trigger frame 1402 being the next frame in the sequence of frames within the A-MPDU 1214, the STA can then assume that any RU allocated by the trigger frame 1402 will be for the STA that is identified in the RA field 1222. For example, the receiving STA can ignore the value of the association ID field (e.g., an AID12 subfield) of the trigger frame and instead rely on identifying the intended recipient based on the proximity to the MPDU. Similar assumptions may be made for the trigger frame 1404 based on its position relative to MPDU 1218 and trigger frame 1406 based on its position relative to MPDU 1220. Alternatively, instead of using an assumed intended recipient of the trigger frame based on position of the trigger frame relative to other frames, the trigger frame could include an association ID field (e.g., an AID12 subfield) with a value that signals an association with a specific wireless communication device or a group of wireless communication devices.

Placing a trigger frame immediately after the MPDU that is associated with the trigger frame (e.g., the trigger frame is allocating an RU for the STA addressed in the MPDU to respond to the MPDU), rather than at the end of the sequence of frames of the A-MPDU may also allow partial A-MPDU recovery in the event that a portion of the A-MPDU was lost, corrupted, or otherwise not received by the intended recipient. For example, if the A-MPDU 1214 of FIG. 14 was corrupted at a position between the trigger frame 1402 and the MPDU 1218, then the STA associated with the MPDU 1216 and the trigger frame 1402 may still be able to process and respond to the AP that sent the MPDU 1216 and the trigger frame 1402. If all the trigger frames 1402, 1404, and 1406 in this example would have been placed at the end of the frame sequence in the A-MPDU 1214, then this partial recovery may not have been available because the STA would not have had an allocated RU to enable an acknowledgement of at least this information. The STA would not have been able to send an acknowledgement and the AP would assume that all information of the A-MPDU was lost. It may then try to resend the entirely of the A-MPDU 1214 again despite successful reception of the MPDU 1216. In the example where the A-MPDU was corrupted at a position between the trigger frame 1402 and the MPDU 1218, then the STA associated with the MPDU 1218 and the trigger frame 1404, and the STA associated with the MPDU 1220 and the trigger frame 1406, will be unable to decode and process the corrupted/lost portion of the A-MPDU 1214 and thus may determine that their uplink transmission was not successful. If the downlink response does not arrive in a retransmission of the corrupted/lost A-MPDU, then STAs may eventually try to initiate future random access communications with the AP in future RUs allocated for communications with unassociated STAs.

Returning to FIG. 5, at block 510, the AP outputs the frame, which includes the A-MPDU 1214, for transmission to multiple unassociated STAs. In one implementation, a microchip or integrated circuit (e.g., a modem chip) that is a sub-component of the AP may output the frame for eventual physical transmission over the air through other sub-components of the AP, such as a radio frequency transmitter and an antenna of the AP (and other radio frequency transmission components of the AP). In another implementation, the AP itself as an entire unit outputs the frame for transmission by formatting the message data and generating the physical over-the-air transmission of the data of the frame to be received by multiple STAs.

Figure 6:
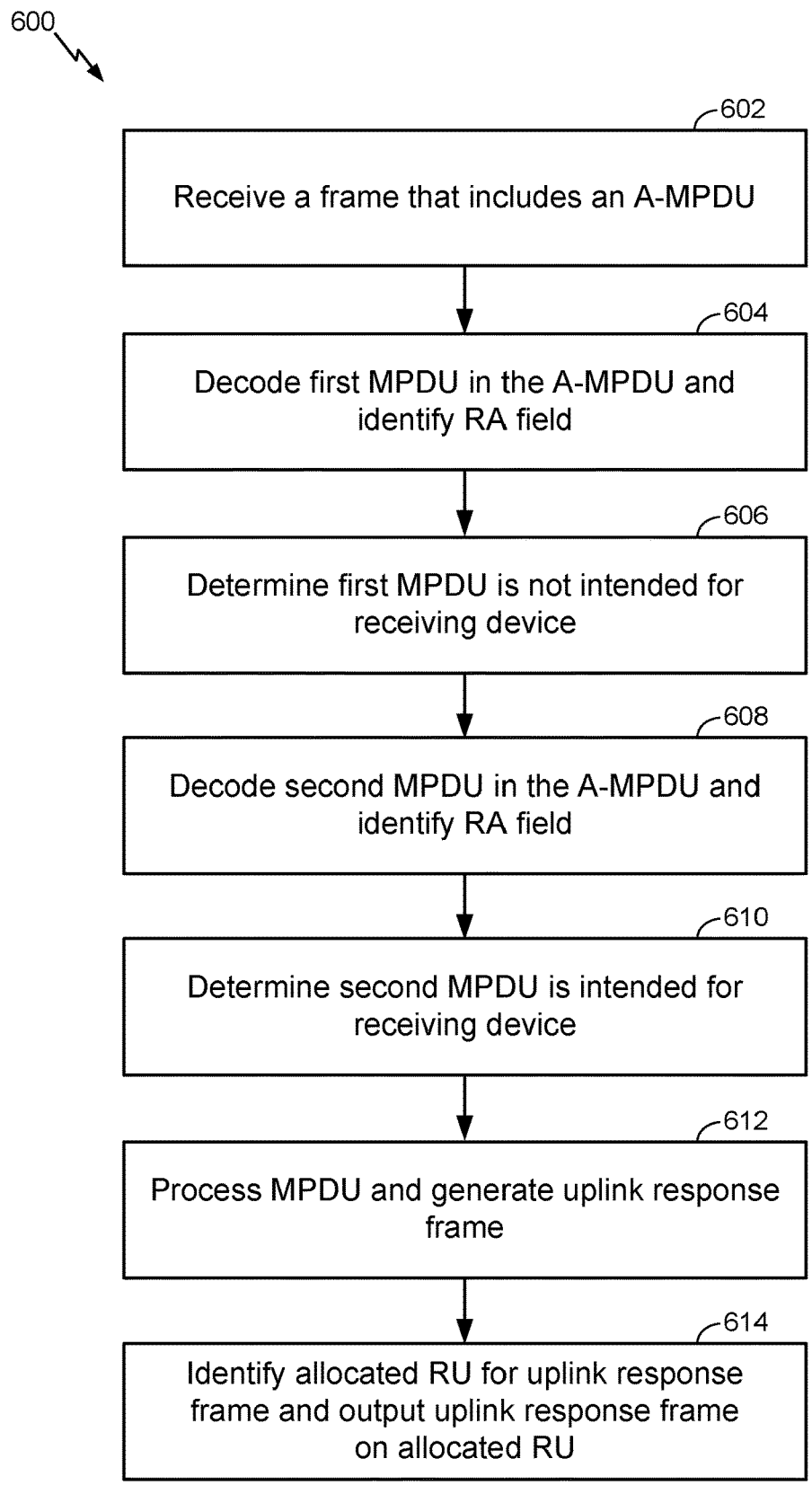
FIG. 6 is a flow diagram illustrating a first example of a technique for processing an incoming aggregated data unit that communicates with multiple different stations.

FIG. 6 is a flow diagram illustrating an example of a process 600 for processing an incoming aggregated data unit that communicates with multiple different stations. In process 600, a wireless communication device may receive a frame that includes an aggregated data unit from a second device. The wireless communication device may be a STA (when receiving the frame from an AP or another STA) or an AP (when receiving the frame from a STA or another AP). Note that for the remainder of the description of this flow diagram, a STA (e.g., STA 115 of FIG. 4) will be described as the wireless communication device receiving and processing the frame, although the frame may be received by an AP (e.g., AP 105 of FIG. 3) in other implementations.

In some implementations, process 600 begins at a point in the sequence when the STA has already (1) received a trigger frame from an AP allocating one or more RUs for random access communications; and (2) sent a trigger-based message to the AP on the allocated RU in response to the trigger frame. Thus, process 500 starts when the STA receives a downlink response to the trigger-based message sent by the STA. Other implementations may use the techniques of FIG. 6 in other contexts. In one implementation, the process 600 of FIG. 6 is the station-side counterpart to the AP-side process 500 of FIG. 5. For example, in process 600 the actions are performed by a STA receiving and processing an incoming MU PPDU formatted by an AP according to the process 500 of FIG. 5.

At block 602, a STA receives a frame from another device, such as an AP. The frame may be structured the same or similar to the MU PPDU 1202 of FIG. 12 (as optionally modified in some implementations by the various additional options of FIGS. 13 and 14). The MU PPDU 1202 includes at least one A-MPDU (see A-MPDU 1214). A-MPDU 1214 includes multiple MPDUs 1216, 1218, and 1220, which include RA fields 1222, 1224, and 1226 respectively.

At block 604, the STA decodes a first MPDU 1216 in the received A-MPDU 1214 and identifies the RA field 1222 in the first MPDU 1216. At block 606, the STA analyzes the value of the RA field 1222 and determines that the MPDU 1216 is not intended for the receiving STA. For example, the RA field 1222 may identify a different STA that also sent a message to the AP in response to the AP's trigger frame that allocated an RU for random access communications by unassociated STAs. If the STA was to follow current section 9.7.3 of the 802.11-2016 standard (stating that "[a]ll of the MPDUs within an A-MPDU are addressed to the same RA"), the STA could skip processing the remaining MPDUs of the A-MPDU 1214 because all the MPDUs of the A-MPDU would be expected to be addressed to the same STA. However, when the AP has included MPDUs directed to different STAs within a single A-MPDU (as done in the process 500 of FIG. 5), the receiving STA may then continue to process additional MPDUs of the A-MPDU even when the first MPDU is not addressed to this STA. Thus, at block 608, the STA continues decoding MPDUs and moves to decode a second MPDU 1218 and identify the RA field 1224 of the second MPDU 1218.

At block 610, the STA determines that the MPDU 1218 is intended for the receiving STA. For example, the STA may determine that the RA field 1224 includes a value that identifies the receiving STA as the intended recipient. At block 612, the STA processes the MPDU 1218 and generates an uplink response frame, such as an acknowledgement confirming receipt of the MPDU 1218. The STA may also decode any additional MPDUs within the A-MPDU 1214, such as MPDU 1220 and determine if MPDU 1220 is intended for the STA. At block 614, the STA identifies an RU allocated for the STA to send the uplink response frame, and then outputs the uplink response frame for transmission to the AP. The STA may identify an RU allocation by processing a TRS control field in the MPDU 1218 (see TRS control field 1304 of FIG. 13) or by processing a trigger frame associated with the MPDU 1218 (see trigger frame 1404 of FIG. 14), as discussed more fully above in connection with block 508 of FIG. 5.

Figure 7:
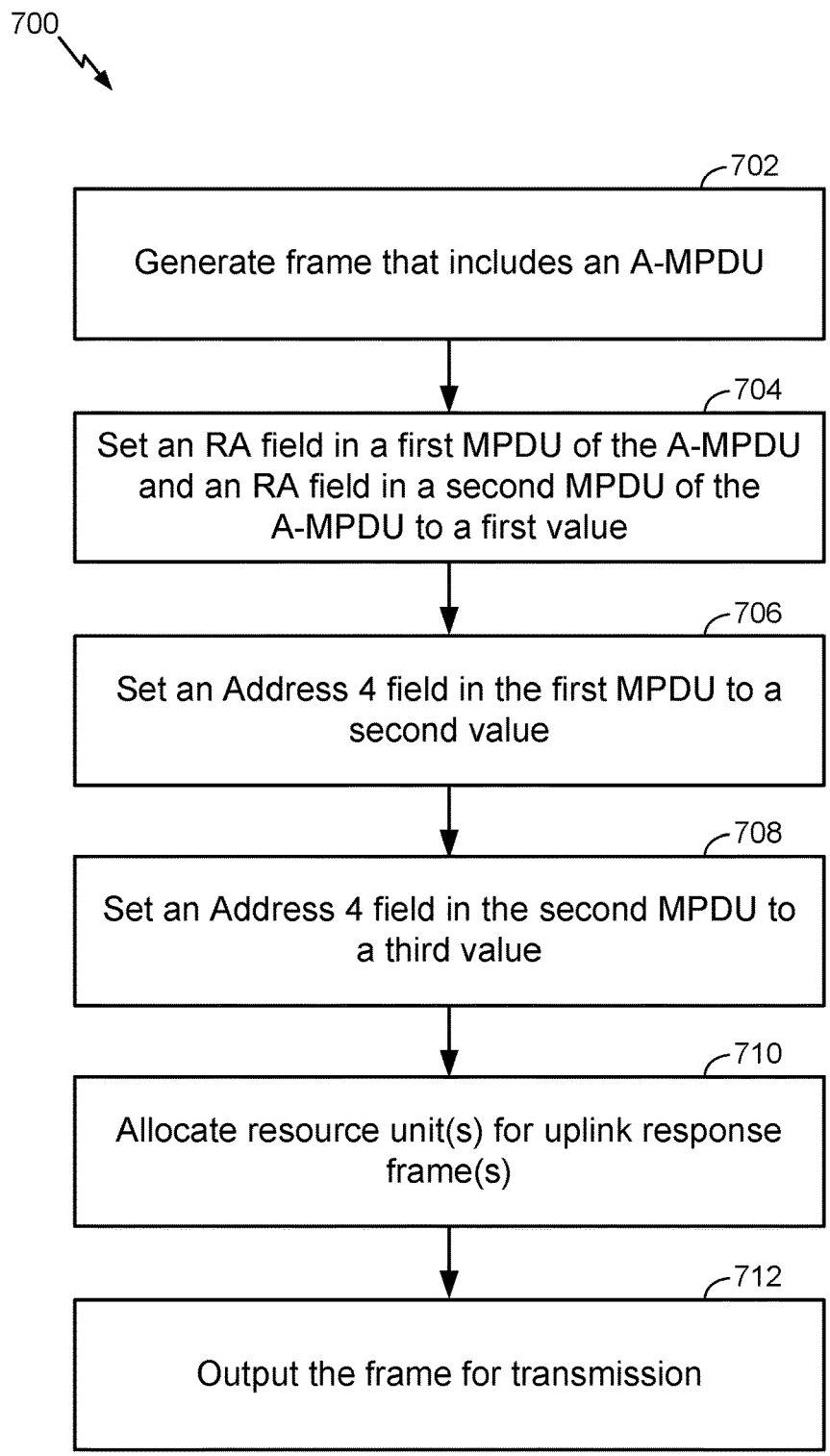
FIG. 7 is a flow diagram illustrating a second example of a technique for communicating with multiple different stations via an aggregated data unit.

FIG. 7 is a flow diagram illustrating an example of a process 700 for communicating with multiple different stations via an aggregated data unit (e.g., an A-MPDU), in accordance with various aspects of the present disclosure. In process 700, a wireless communication device, such as an AP (for responding to other STAs and/or APs that sent trigger-based messages) or a STA (for responding to other STAs and/or APs that sent trigger-based messages) generates a frame that includes an aggregated data unit. Note that for the remainder of the description of this flow diagram, an AP (e.g., AP 105 of FIG. 3) will be described as the wireless communication device sending the frame that includes the aggregated data unit, although the frame may be generated by a STA (e.g., STA 115 of FIG. 4) in other implementations.

In some implementations, process 700 begins at a point in the sequence when the AP has already (1) sent a trigger frame to multiple unassociated STAs allocating one or more RUs for random access communications; and (2) received multiple trigger-based messages from multiple unassociated STAs. Thus, process 700 starts when the AP determines that it will send a downlink response to the multiple trigger-based messages. At block 702, the AP generates a frame to respond to the multiple trigger-based messages from multiple unassociated STAs. Other implementations may use the techniques of FIG. 7 in other contexts. In the implementation of FIG. 7, the AP may determine that it will respond to the multiple STAs in a single downlink MU PPDU.

At block 702, the AP generates a frame that includes at least one A-MPDU that will be designated to communicate with multiple unassociated STAs (see, e.g., A-MPDU 1214 of FIG. 12). In this situation, the AP will set the STA ID indication 1206 to a value (e.g., 2045) that indicates broadcast communication on RU 1210 with unassociated STAs. The RU 1210 will then be used to carry the A-MPDU 1214 to communicate with the multiple unassociated STAs.

At block 704, the AP will set the RA fields in multiple MPDUs of the A-MPDU 1214 to a same value. For example, the AP may set the RA fields 1222, 1224, and 1226 to be the same value, such as a value that indicates a broadcast communication type (e.g., a multi-recipient communication type). In this implementation, because each of the RA fields 1222, 1224, and 1226 will not identify a unique STA as the recipient of the MPDU, the AP may use a different portion of the MPDU to identify the specific intended recipient. As one example, the AP may use an address 4 field to identify a single intended recipient of an MPDU (as described in FIGS. 7, 8, 13, and 16). As another example, the AP may use one of the BA fields (such as the BA information field) in a Multi-STA BlockAck (BA) frame type to identify one or more intended recipients of an MPDU (as described in FIGS. 18, 19, and 20). FIG. 16 illustrates one example of a media access control (MAC) frame format 1600 that includes an address 1 field 1606, an address 4 field 1614, and other fields (including other address fields). In some implementations, the additional fields may include a frame control field 1602, a duration/ID field 1604, an address 2 field 1608, an address 3 field 1610, a sequence control field 1612, a QoS control field 1616, a HT control field 1618, a frame body 1620, and an FCS 1622. In some implementations, the HT control field 1618 may include an A-Control subfield that includes the TRS control field 1700 shown in FIG. 17. In one implementation for process 700, the AP may use the address 1 field 1606 to be the RA field that carries a value common to all MPDUs within one A-MPDU, and may use the address 4 field 1614 to carry the unique address of the intended STA recipient. This implementation may be based on an exception to the general practice that the address 4 field is not used in many types of communications. Rather, to enable this implementation, the address 4 field will be enabled for situations where an MPDU is carried in an A-MPDU for an RU with a station identification (STA ID) field indicating communication with unassociated STAs.

FIG. 13 illustrates one example of the A-MPDU 1214 of FIG. 12 that includes an optional address 4 field (e.g., in the format shown in FIG. 16) in one or more of the MPDUs of the A-MPDU. Specifically, FIG. 13 illustrates: (1) an address 4 field 1308 in MPDU 1216 to identify a first STA as the intended recipient of MPDU 1216; (2) an address 4 field 1310 in MPDU 1216 to identify a second STA as the intended recipient of MPDU 1218; and (3) an address 4 field 1312 in MPDU 1220 to identify a third STA as the intended recipient of MPDU 1220.

At block 706 of FIG. 7, the AP sets the address 4 field 1308 (of FIG. 13) to a first value that identifies a first STA that sent an uplink trigger-based message to the AP. At block 708, sets the address 4 field 1310 (of FIG. 13) to a second value, different than the first value, that identifies a second STA that sent an uplink trigger-based message to the AP. The AP may also set the address 4 field for one or more other MPDUs of the A-MPDU 1214 to address other STAs, such as the address 4 field 1312 in the MPDU 1220 of FIG. 13.

At block 710, the AP allocates one or more resource units to enable the STAs that will receive the messages included in the MPDUs 1216, 1218, and 1220 to send an uplink response message. The operations of block 710 are described above in connection with block 508 (including with reference to the options involving the TRS control filed and/or aggregating trigger frames with the MPDUs of the A-MPDU 1214). At block 712, the AP outputs the frame, which includes the A-MPDU 1214, for transmission to multiple unassociated STAs, as described above in connection with block 510.

Figure 8:
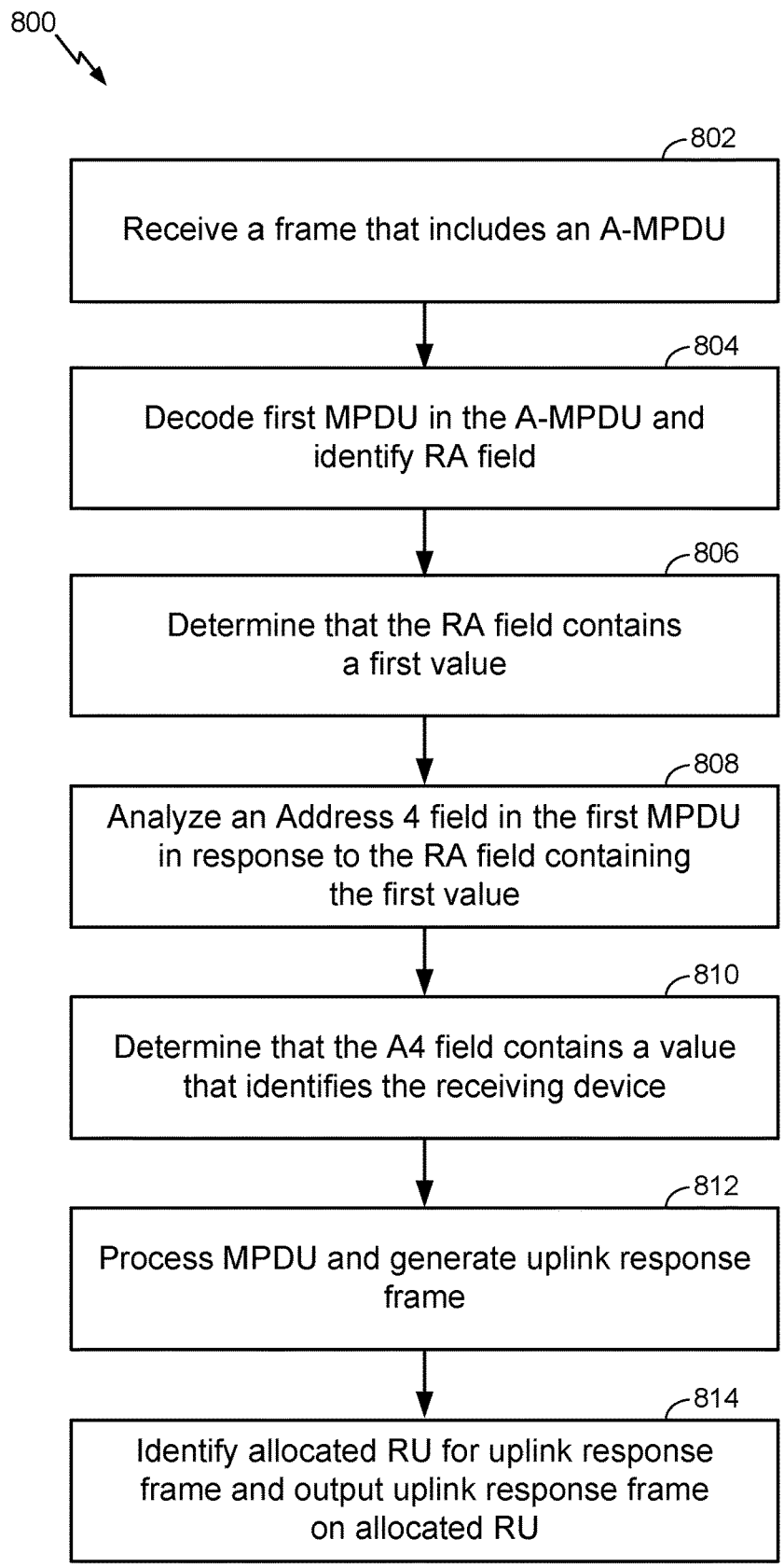
FIG. 8 is a flow diagram illustrating a second example of a technique for processing an incoming aggregated data unit that communicates with multiple different stations.

FIG. 8 is a flow diagram illustrating an example of a process 800 for processing an incoming aggregated data unit that communicates with multiple different stations. In process 600, a wireless communication device may receive a frame that includes an aggregated data unit from a second device. The wireless communication device may be a STA (when receiving the frame from an AP or another STA) or an AP (when receiving the frame from a STA or another AP). Note that for the remainder of the description of this flow diagram, a STA (e.g., STA 115 of FIG. 4) will be described as the wireless communication device receiving and processing the frame, although the frame may be received by an AP (e.g., AP 105 of FIG. 3) in other implementations.

In some implementations, process 800 begins at a point in the sequence when the STA has already (1) received a trigger frame from an AP allocating one or more RUs for random access communications; and (2) sent a trigger-based message to the AP on the allocated RU in response to the trigger frame. Thus, process 800 starts when the STA receives a downlink response to the trigger-based message sent by the STA. Other implementations may use the techniques of FIG. 8 in other contexts. In one implementation, the process 800 of FIG. 8 is the station-side counterpart to the AP-side process 700 of FIG. 7. For example, in process 800 the actions are performed by a STA receiving and processing an incoming MU PPDU formatted by an AP according to the process 700 of FIG. 7.

At block 802, a STA receives a frame from another device, such as an AP. The frame may be structured the same or similar to the MU PPDU 1202 of FIG. 12 (as optionally modified in some implementations by the various additional options of FIGS. 13 and 14). The MU PPDU 1202 includes at least one A-MPDU (see A-MPDU 1214). A-MPDU 1214 includes multiple MPDUs 1216, 1218, and 1220, which include RA fields 1222, 1224, and 1226 respectively. For the implementation of process 800, the MPDUs 1216, 1218, and 1220 also include address 4 fields 1308, 1310, and 1312 (see FIG. 13).

At block 804, the STA decodes a first MPDU 1216 in the received A-MPDU 1214 and identifies the RA field 1222 in the first MPDU 1216. At block 806, the STA analyzes the value of the RA field 1222 and determines that the RA field 1222 includes a special value (such as a value that indicates a broadcast communication type or a multiple recipient communication type). In some implementations, this same value may be included in the RA fields for all the MPDUs in the A-MPDU 1214. As an alternative to analyzing the RA field 1222 at block 806, the STA may determine that the A-MPDU 1214 is carried in an RU allocated for communication with unassociated stations (in which case the STA may ignore the RA field in some implementations). In response to identifying the special (e.g., broadcast) value in the RA field 1222 or that the A-MPDU 1214 is carried in an RU allocated for communication with unassociated stations, the STA knows to analyze an address 4 field 1308 in the first MPDU 1216 (see FIG. 13) instead of the RA field 1222 to determine whether the MPDU 1216 is addressed to this specific STA. At block 808, the STA analyzes the address 4 field 1308 and at block 810 determines that the address 4 field 1308 contains a value that identifies this specific STA. In the example of process 800, the first MPDU 1216 included an address 4 field 1308 that identifies the receiving STA. However, in other examples, the STA may find a matching address 4 field in a later MPDU or no MPDU at all. Thus, the STA may continue processing RA and address 4 fields of subsequent MPDUs similar to the processing at blocks 804, 806, and 808.

At block 812, the STA processes the MPDU 1216 and generates an uplink response frame, such as an acknowledgement confirming receipt of the MPDU 1216. At block 814, the STA identifies an RU allocated for the STA to send the uplink response frame, and then outputs the uplink response frame for transmission to the AP. The STA may identify an RU allocation by processing a TRS control field in the MPDU 1216 (see TRS control field 1302 of FIG. 13) or by processing a trigger frame associated with the MPDU 1216 (see trigger frame 1402 of FIG. 14), as discussed more fully above in connection with block 508 of FIG. 5.

Figure 9:
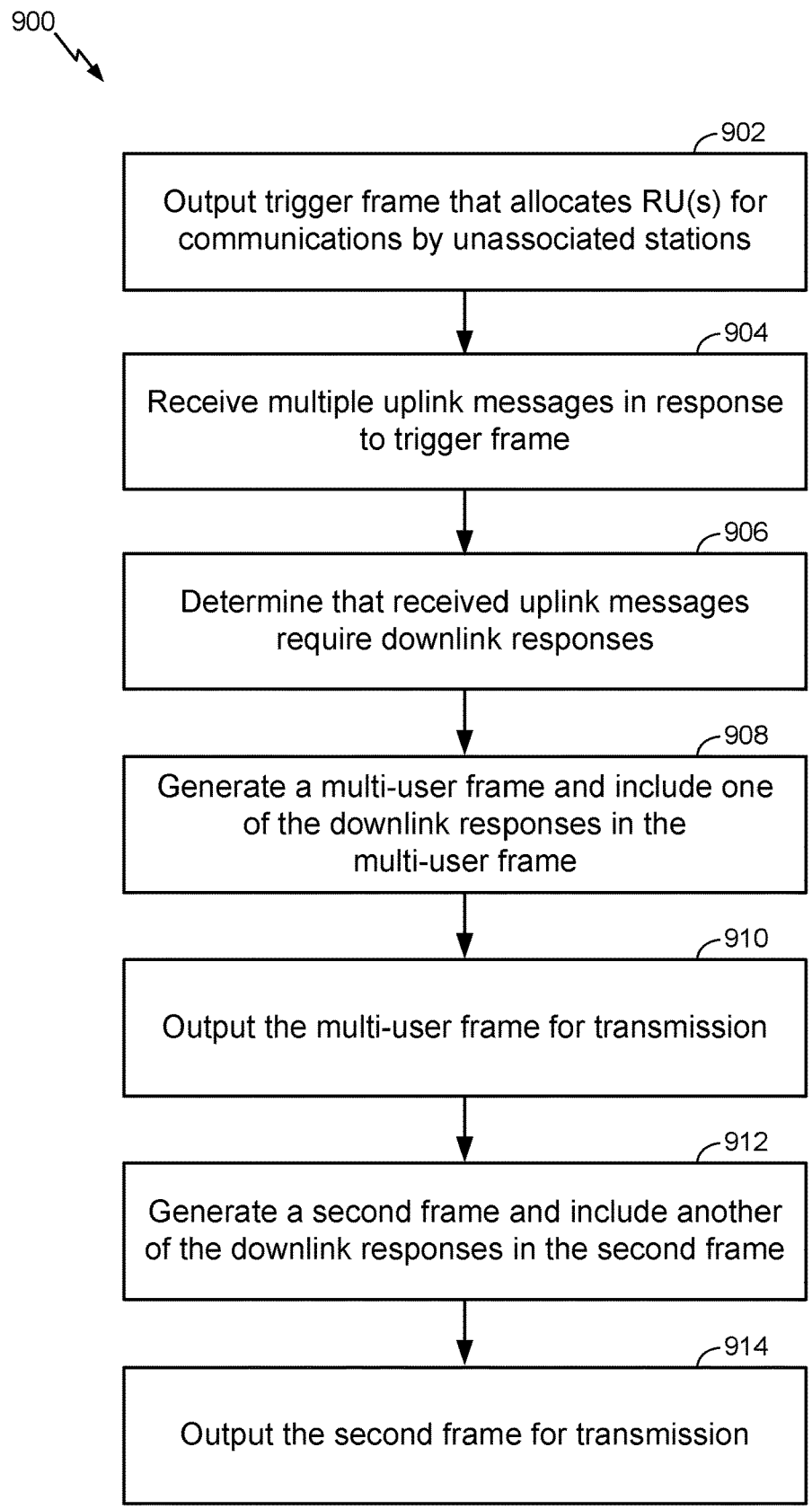
FIG. 9 is a flow diagram illustrating an example of a technique for sending multiple frames related to random access communications with multiple unassociated stations.

FIG. 9 is a flow diagram illustrating an example of a process 900 for sending multiple frames related to random access communications with multiple unassociated devices, in accordance with various aspects of the present disclosure. In process 900, a wireless communication device, such as an AP (for responding to multiple STAs that sent trigger-based uplink messages) or a STA (for responding to other STAs and/or APs that sent trigger-based messages) generates multiple frames related to random access communications with multiple unassociated devices. Note that for the remainder of the description of this flow diagram, an AP (e.g., AP 105 of FIG. 3) will be described as the wireless communication device sending the multiple frames related to random access communications with multiple unassociated stations, although the frame may be generated by a STA (e.g., STA 115 of FIG. 4) in other implementations.

At block 902, the AP outputs a trigger frame (e.g., the trigger frame 200 of FIG. 2) that allocates one or more RUs for random access communications by one or more STAs that are currently unassociated with the AP. Random access communications in one implementation differ from directed communications in that any STA within a designated category (e.g., all associated STAs or all unassociated STAs) may access an allocated RU in random access communication mode as opposed to only a specific STA directed by the AP to use the RU in directed communication mode. When an RU is allocated for random access communications by unassociated STAs, any unassociated STA may contend for the allocated RU. The AP may customize the fields of the trigger frame to indicate that it allocates one or more RUs for random access communications by one or more STAs that are currently unassociated with the AP. In one implementation, the AP may signal the random access RU allocation in a user information field of the trigger frame (e.g., user information field 212 of trigger frame 200 of FIG. 2). The user information field 212 may include multiple subfields such as an AID12 subfield and an RU allocation subfield (among other subfields). In one implementation, the AP uses the AID12 subfield to signal that the trigger frame includes one or more RUs (as identified by the RU allocation subfield of the user information field 212) allocated for random access communications by one or more STAs that are currently unassociated with the AP. The AID12 subfield carries the 12 least significant bits of the association identification (AID) of the STA for which the user information field of the trigger frame is intended. When the AP sets the AID12 subfield to a value of 2045 (or any other designated value), the AP is indicating that the user information field is allocated for random access communications by STAs that are unassociated with the AP.

At block 904, the AP receives multiple uplink messages sent in response to the trigger frame output at block 902. A STA that receives the trigger frame from block 902 may send a trigger-based PPDU in response to the trigger frame on the allocated RU (e.g., it may use the subcarriers of the allocated RU to transmit its response frame). At block 906, the AP determines that the received uplink messages require downlink responses. For example, if the STAs send probe requests to the AP, then the AP may determine that it will respond with a probe response back to each of the requesting STAs.

When multiple STAs use the opportunity to communicate with the AP, the AP may need to coordinate multiple response frames responses back to the STAs. As discussed above in connection with FIGS. 5 and 7, there are some implementations that allow a single MU frame to communicate response messages back to multiple STAs. However, these implementations may be enabled by a standard change that allows the RA fields of different MPDUs in an A-MPDU to have different values (see FIG. 5) or by use of extra address field, such as an address 4 field (see FIG. 7). Some other implementations may not desire these types of changes. These implementations may instead break up the responses into multiple different transmission opportunities instead of trying to package all responses into a single MU frame.

At block 908, the AP generates an MU frame. When the AP has multiple responses due to multiple different STAs who sent messages to the AP on the RU allocated in the trigger frame for communications by unassociated STAs, the AP may elect to include at least one of the responses in the MU frame. The AP may then send the other responses in different transmission opportunities (either earlier or later than the transmission opportunity that was used for the MU frame). The other responses may be separate single-user (SU) transmissions or may be separate MU transmissions. By including at least one response to an unassociated STA into an MU frame that contains other frames targeted to other STAs, the AP can gain some transmission efficiency relative to keeping all downlink messages intended for unassociated STAs for separate later transmission opportunities.

Figure 15:
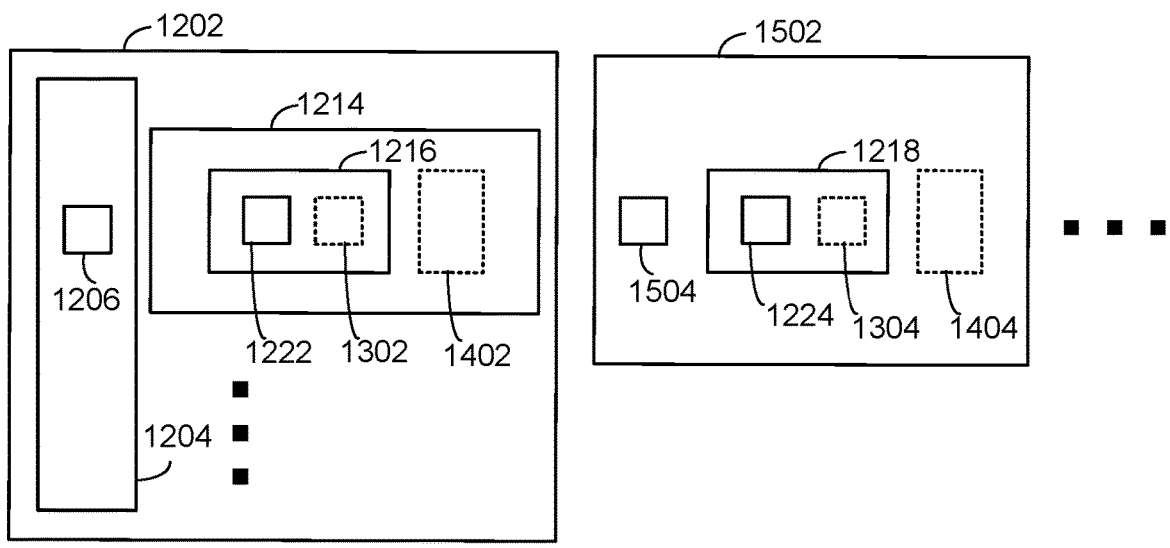
FIG. 15 is an example of a multi-user frame followed by a second frame.

FIG. 15 is one example of an MU frame followed by a second frame (which could either be MU or SU). FIG. 15 shows an example of the MU frame 1202 (which is shown as a simplified version of the frame shown in FIG. 12) where the A-MPDU 1214 includes an MPDU 1216 intended for one of the unassociated STAs that sent a trigger-based message to the AP. The MPDU 1216 includes an RA field 1222 that identifies the unassociated STA that is the intended recipient of the MPDU 1216. The AP may also allocate an RU for the STA addressed by the RA field 1222 to send a response frame back to the AP (e.g., to acknowledge receipt of the MPDU 1216). The AP may either include a TRS control field 1302 in the MPDU 1216 or may aggregate a trigger frame 1402 with the MPDU 1216 to allocate the RU for the future uplink response. The MU frame 1202 may also include other frames (not shown) intended for other STAs. At block 910, the AP outputs the MU PPDU 1202 for transmission to the STA addressed by the MPDU 1216 and any other STA addressed by other frames in the MU PPDU 1202.

At block 912 of FIG. 9, the AP generates a second frame to be transmitted in a second transmission opportunity to carry one or more other responses to unassociated STAs that sent trigger-based messages to the AP. FIG. 15 shows an example of a second frame 1502 that is used to carry the second MPDU 1218 that is intended for an unassociated STA. The second frame 1502 includes an indication 1504 regarding the recipient or type of use of the RU that will carry the MPDU 1218. In one implementation, the indication 1504 may be located in a station identification portion of a frame header (e.g., a STA ID field). When the AP sets the STA ID field to a value of 2045 (or any other designated value), the AP is indicating broadcast communications with STAs that are unassociated with the AP. The second MPDU 1218 may include an RA field 1224 that identifies the intended unassociated recipient STA. The AP may also allocate an RU for the STA addressed by the RA field 1224 to send a response frame back to the AP (e.g., to acknowledge receipt of the MPDU 1216). The AP may either include a TRS control field 1304 in the MPDU 1218 or may aggregate a trigger frame 1404 with the MPDU 1218 to allocate the RU for the future uplink response. Returning to FIG. 9, at block 914, the AP outputs the second frame 1502 for transmission to the STA addressed by the MPDU 1218.

Figure 10:
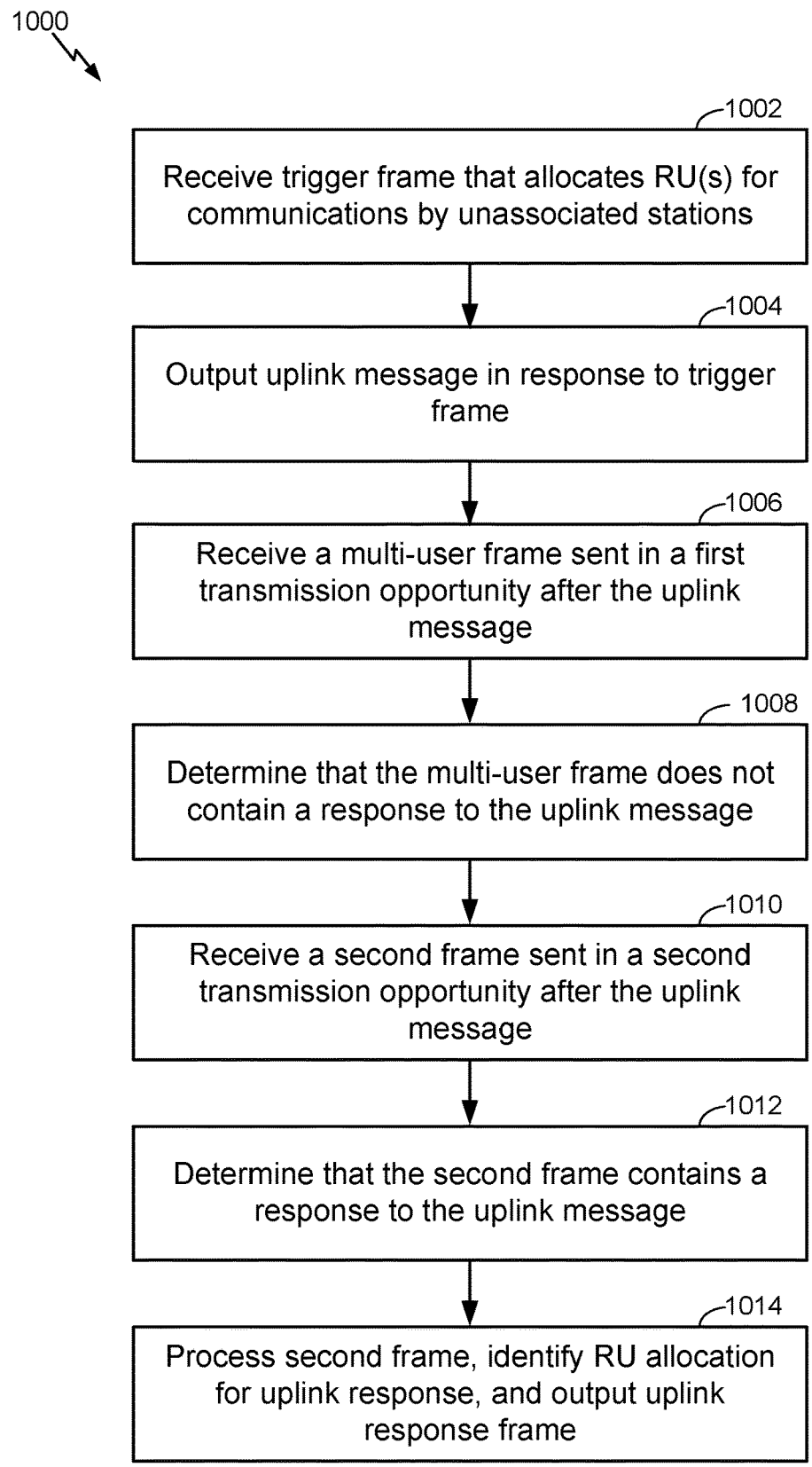
FIG. 10 is a flow diagram illustrating an example of a technique for processing multiple frames related to random access communications with multiple unassociated stations.

FIG. 10 is a flow diagram illustrating an example of a process 1000 for processing multiple frames related to random access communications. In process 1000, a wireless communication device may receive multiple frames related to random access communications from a second device. The wireless communication device may be a STA (when receiving the frames from an AP or another STA) or an AP (when receiving the frames from a STA or another AP). Note that for the remainder of the description of this flow diagram, a STA (e.g., STA 115 of FIG. 4) will be described as the wireless communication device receiving and processing the multiple frames related to random access communications, although the frames may be received by an AP (e.g., AP 105 of FIG. 3) in other implementations. In one implementation, the process 1000 of FIG. 10 is the STA-side counterpart to the AP-side process 900 of FIG. 9. For example, in process 1000 the actions are performed by a STA receiving and processing an incoming MU PPDU, and at least a second frame, all formatted by an AP according to the process 900 of FIG. 9.

At block 1002, a STA receives a trigger frame that allocates one or more RUs for communications by unassociated STAs. The trigger frame may be formatted as discussed above in connection with block 902 (FIG. 9). At block 1004, the STA outputs a trigger-based response to the AP (e.g., a probe response or other management frame) on the RU allocated by the trigger frame. At block 1006, the STA receives an MU frame (e.g., MU PPDU 1202 of FIG. 15) sent in a first transmission opportunity after the AP receives the uplink trigger-based message from the STA. The MU frame may be formatted as discussed above in connection with block 908. At block 1008, the STA determines that the MU frame does not contain a response to the trigger based message the STA previously sent to the AP in response to the trigger frame. For example, the STA may analyze the indication 1206, the RA field 1222, or both, and determine that the A-MPDU 1214 is not intended for the STA. The STA may also analyze other RUs used by the MU PPDU 1202 and determine that those RUs also do not contain a response for the STA.

At block 1010, the STA may receive a second frame (e.g., the frame 1502 of FIG. 15) sent in a second (or subsequent) transmission opportunity after the AP receives the uplink trigger-based message from the STA. The second frame may be formatted as discussed above in connection with block 912. At block 1012, the STA determines that the second frame does contain a response to the trigger based message the STA previously sent to the AP in response to the trigger frame. For example, the STA may analyze the indication 1504, the RA field 1224, or both, and determine that the MPDU 1218 is intended for the STA. At block 1014, the STA fully processes the second frame because it is intended for the receiving frame, identifies an RU allocation for an uplink response message (e.g., an acknowledgment of receipt of the MPDU 1218) by using an RU allocation signaled in TRS control field 1304 or trigger frame 1404 (see FIG. 15), and outputs the uplink response message for transmission to the AP on the allocated RU.

As discussed above, there are multiple different solutions for ways to address and communicate with unassociated STAs. As a first example, the solutions of FIGS. 5 and 6 relate to using different values in the RA fields of different MPDUs to differentiate the intended recipients. As a second example, the solutions of FIGS. 7 and 8 relate to using different values in the address 4 fields of different MPDUs to differentiate the intended recipients. As a third example, the solutions of FIGS. 9 and 10 relate to using multiple frames in multiple different transmission opportunities to differentiate the intended recipients. The first and second examples may be enabled by an exception to the IEEE 802.11 baseline standard processing (as discussed above). Thus, these solutions may be conditionally enabled by a capability advertisement sent by the STAs to the AP, such as in a bit of the high efficiency (HE) capabilities element. The capability advertisement may indicate whether the STA can support multi-destination receiving in a broadcast RU. For example, STAs may advertise that they can support receiving A-MPDUs that have MPDUs with different RA values or can support receiving MPDUs where the intended recipient is indicated in the address 4 field. An AP may then use this indication to decide which STAs to include in such multi-destination A-MPDUs. For STAs that do not signal this capability, the AP may use the example solution of FIGS. 9 and 10 or may communicate with SU transmissions.

Figure 11:
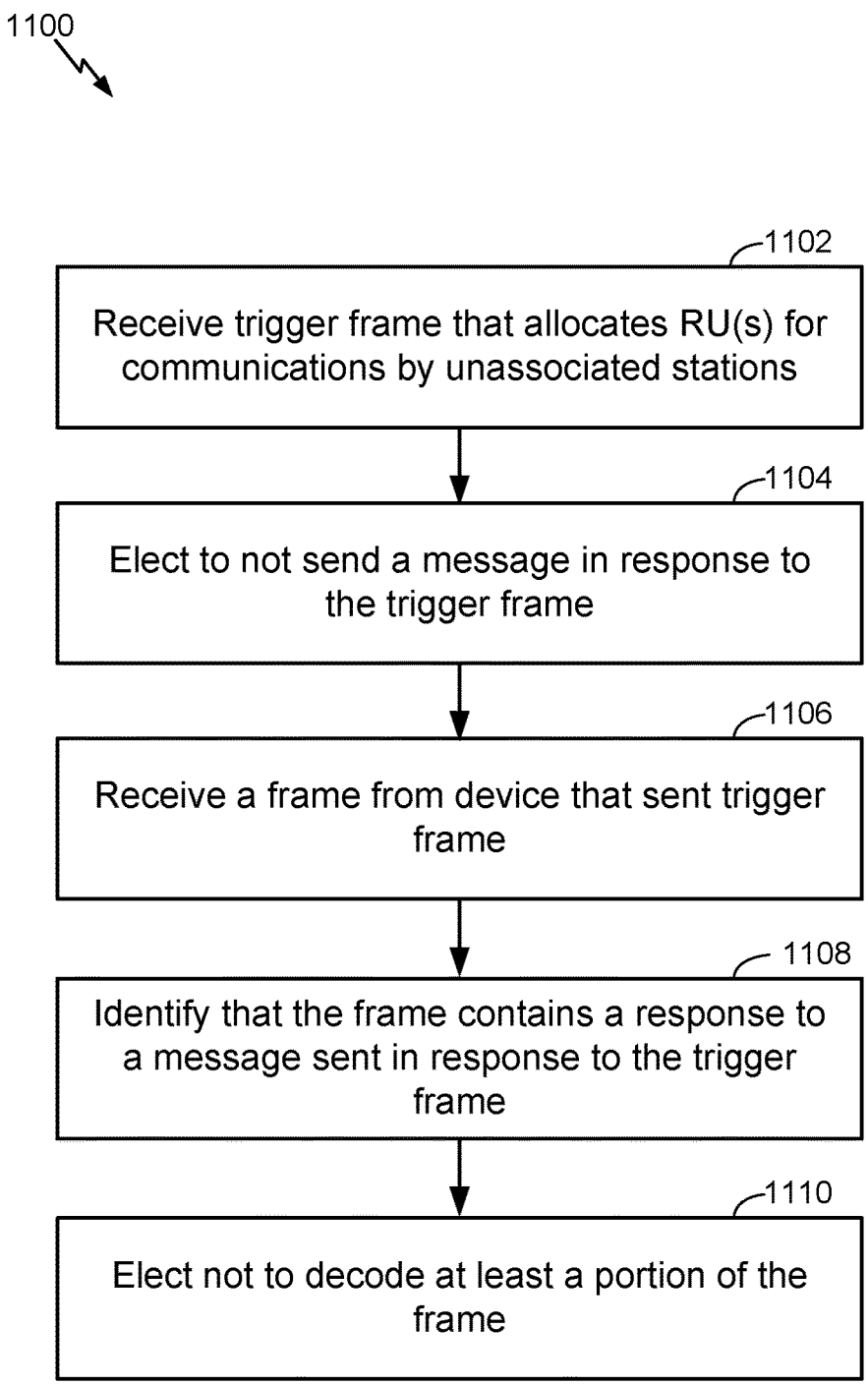
FIG. 11 is a flow diagram illustrating an example of a technique for determining whether to decode an incoming message related to communication with unassociated stations.

FIG. 11 is a flow diagram illustrating an example of a process 1100 for determining whether to decode an incoming message related to random access communication. In process 1100, a wireless communication device may receive a frame related to random access communications from a second device. The wireless communication device may be a STA (when receiving the frame from an AP or another STA) or an AP (when receiving the frame from a STA or another AP). Note that for the remainder of the description of this flow diagram, a STA (e.g., STA 115 of FIG. 4) will be described as the wireless communication device receiving and processing the frame related to random access communications, although the frame may be received by an AP (e.g., AP 105 of FIG. 3) in other implementations.

At block 1102, a STA receives a trigger frame that allocates one or more RUs for communications by unassociated STAs. The trigger frame may be formatted as discussed above in connection with block 902 (FIG. 9). At block 1104, the STA elects to not send a message back to the AP in response to the trigger frame. For example, the STA may not be interested in associating with this AP or discovering additional information about the AP. At block 1106, the STA receives a frame from the AP (e.g., the device that sent the trigger frame). The frame may be sent in a next transmission opportunity after a response to the trigger frame would have been sent (if any was elected to be sent). The frame may be a downlink MU PPDU and include an indication that the frame contains information for one or more unassociated STAs. For example, the frame may include a value of 2045 (or any other designated broadcast special value) for the station identification (STA ID) field of the frame. The STA may decode at least a portion of the frame and determine that the frame is a response to an uplink message sent by a STA in response to the trigger frame. However, because the STA knows that it did not send any message to the AP in response to the trigger frame, the STA can determine on its own (e.g., without needing to find a specific address of a different STA in the message) that this message is not intended for this STA. Thus, at block 1110, the STA may elect not to decode at least a portion of the frame thereby saving processing effort and/or battery power that would otherwise be used to process a frame that is not intended for the STA.

Figure 18:
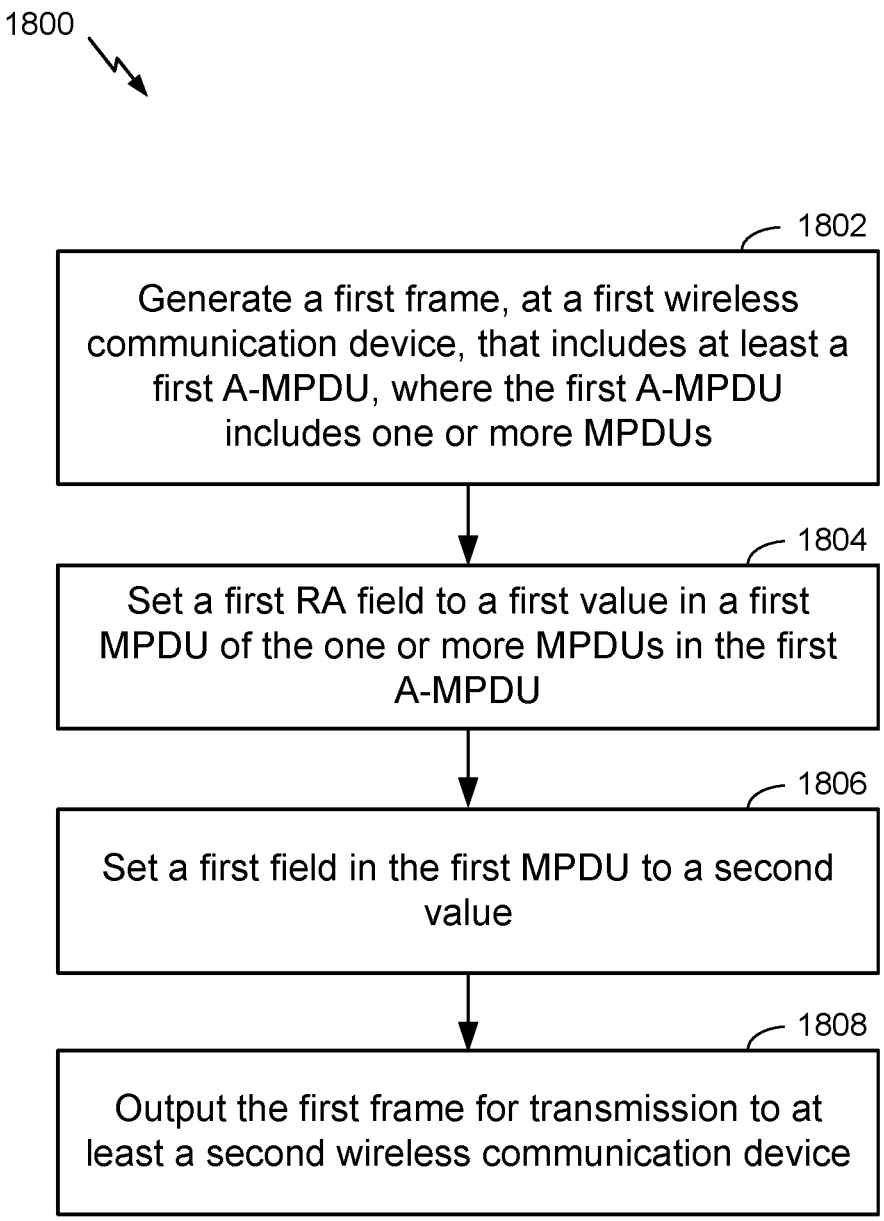
FIG. 18 is a flow diagram illustrating an example of a process for communicating with one or more unassociated STAs via an aggregated data unit.

FIG. 18 is a flow diagram illustrating an example of a process 1800 for communicating with one or more unassociated STAs via an aggregated data unit (e.g., an A-MPDU), in accordance with various aspects of the present disclosure. In process 1800, a wireless communication device, such as an AP (for responding to other STAs and/or APs that sent trigger-based messages) or a STA (for responding to other STAs and/or APs that sent trigger-based messages) generates a first frame that includes an aggregated data unit. Note that for the remainder of the description of this flow diagram, an AP (e.g., AP 105 of FIG. 3) will be described as the wireless communication device sending the first frame that includes the aggregated data unit, although the frame may be generated by a STA (e.g., STA 115 of FIG. 4) in other implementations.

In some implementations, process 1800 begins at a point in the sequence when the AP has already (1) sent a trigger frame to multiple unassociated STAs allocating one or more RUs for random access communications; and (2) received multiple trigger-based messages from multiple unassociated STAs. Thus, process 1800 starts when the AP determines that it will send a downlink response to the multiple trigger-based messages. At block 1802, the AP generates a frame to respond to the multiple trigger-based messages from multiple unassociated STAs. Other implementations may use the techniques of FIG. 7 in other contexts. In the implementation of FIG. 7, the AP may determine that it will respond to the multiple STAs in a single downlink (DL) MU PPDU.

At block 1802, the AP generates a first frame that includes at least a first A-MPDU that will be designated to communicate with multiple unassociated STAs. The first A-MPDU may include one or more MPDUs, and may set the STA ID indication to a value (e.g., 2045) that indicates the first frame is a broadcast communication with unassociated STAs. A RU may be used to carry the A-MPDU to communicate with the multiple unassociated STAs. In some implementations, the first frame may be a Multi-STA BlockAck (BA) frame type. In some implementations, the first frame (such as a BlockAck BA frame) may be included in an RU (such as a broadcast RU) of a DL MU PPDU having a STA ID field set to a value that indicates a broadcast communication with one or more unassociated wireless communication devices. For example, the STA ID field may be set to a value of 2045. In some implementations, the first frame may be included in the DL MU PPDU 1202 shown in FIG. 12, which may include the RU 1210 having the A-MPDU 1214 that may include one or more MPDUs (such as MPDU 1216).

Figure 20:
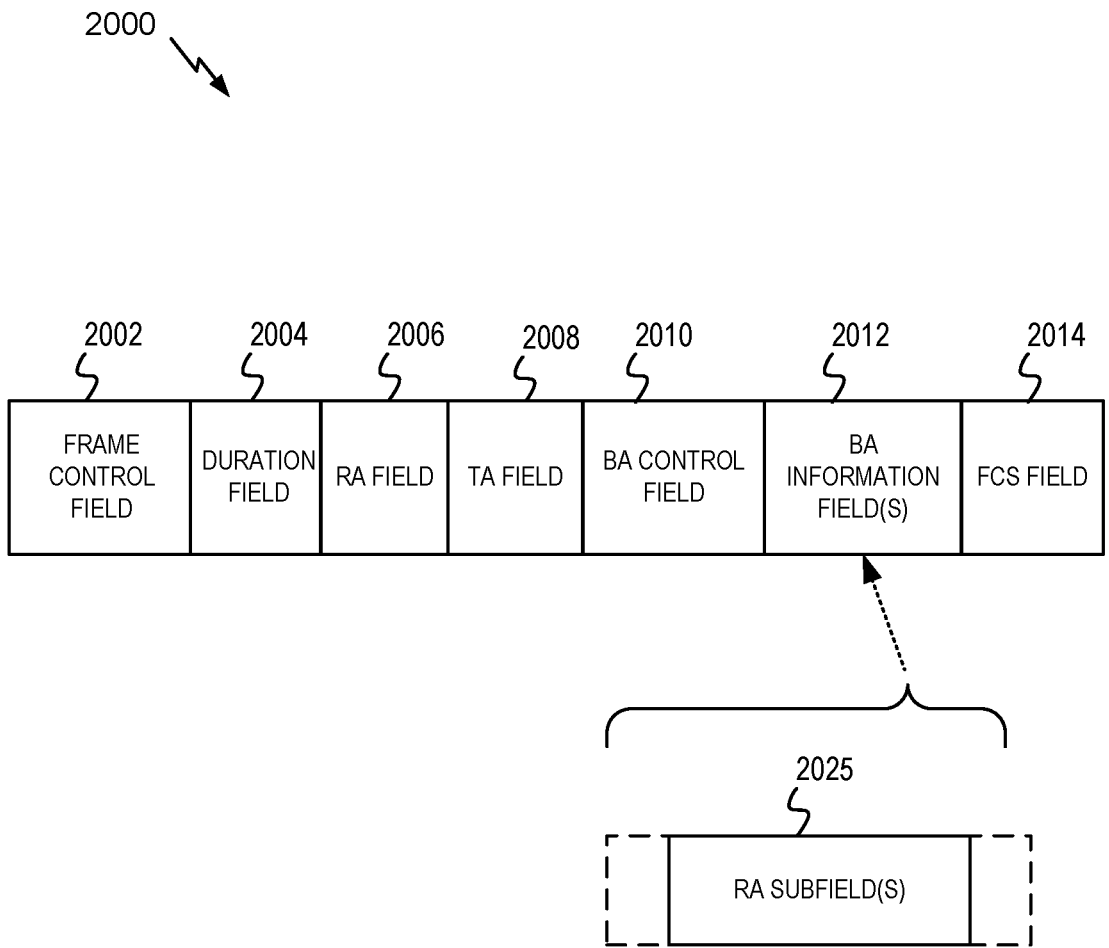
FIG. 20 illustrates one example of a Multi-STA BlockAck (BA) frame format that includes a BA information field having one or more RA subfields.

FIG. 20 illustrates one example of a Multi-STA BA frame format that includes a BA information field having one or more RA subfields. In some implementations, the Multi-STA BA frame 2000 may include a frame control field 2002, a duration field 2004, an RA field 2006, a TA field 2008, a BA control field 2010, one or more BA information field(s) 2012, and an FCS field 2014. The BA information field(s) may include one or more corresponding RA subfield(s) 2025. In some implementations, the BA information field may include one or more AID/TID fields, and each AID/TID fields may include an RA subfield 2025.

Returning to FIG. 18, at block 1804, the AP sets a first RA field to a first value in a first MPDU of the one or more MPDUs in the first A-MPDU. For example, the AP may set the RA field 2006 of the Multi-STA BA frame 2000 to a broadcast address that indicates a broadcast communication type (e.g., a multi-recipient communication type).

At block 1806, the AP (which may be referred to as a first wireless communication device) sets a first field in the first MPDU to a second value. In some implementations, the second value may represent an identifier of a first STA (which may be referred to as a second wireless communication device). For example, the AP may set a first RA subfield 2025 of the first field (such as a first BA information field 2012) to a first address (such as a first MAC address) associated with the first STA. In some implementations, the first field may be a different field in the same or a different frame type. For example, as described above in FIGS. 7 and 8, the first field may be a first address 4 field of a MAC frame type, or, as described in FIGS. 5 and 6, the first field may be a first RA field.

In some implementations, the AP may set a second field in the first MPDU to a third value, different than the second value, that represents an identifier of a second STA (which may be referred to as a third wireless communication device). For example, the AP may set a second RA subfield 2025 of the second field (such as a second BA information field 2012) to a second address (such as a second MAC address) associated with the second STA. In some implementations, the second field may be a different field in the same or a different MPDU in the same or a different frame type. For example, as described above in FIGS. 7 and 8, the second field may be a second address 4 field in a second MPDU of a MAC frame type, or, as described in FIGS. 5 and 6, the second field may be a second RA field in a second MPDU.

At block 1808, the AP outputs the first frame for transmission to at least the first STA. The AP may broadcast the first frame to multiple STAs, such as the first STA and the second STA, when the BA information field of the first frame includes multiple RA subfields 2025 (such as the first and second RA subfields 2025), as described herein in connection with block 1806.

In some implementations, the first frame may be a unicast Multi-STA BA frame that may be directed to a single STA, such as the first STA. In a unicast Multi-STA BA frame, the first value of the first RA field may be the same as the second value of the first field of the first MPDU. For example, both the first RA and the first field of the first MPDU may be set to an address (such as a MAC address) associated with the first STA. In some implementations, the first RA field may be set to a broadcast address, and the first field of the first MPDU may be set to an address (such as a MAC address) associated with the first STA. In some implementations, the first frame (such as the unicast BlockAck BA frame described herein) may be included in an RU (such as a broadcast RU) of a DL MU PPDU having a STA ID field set to a value that indicates a broadcast communication with one or more unassociated wireless communication devices. For example, the STA ID field may be set to a value of 2045. In some implementations, the first frame may be included in the DL MU PPDU 1202 shown in FIG. 12, which may include the RU 1210 having the A-MPDU 1214 that may include one or more MPDUs (such as MPDU 1216).

In some implementations, the first frame may be a response frame that is transmitted to each of one or more unassociated STAs (such as the first STA and the second STA). For example, the response frame may be a probe response frame, a (re)association response frame, or an authentication response frame. In some implementations, the AP may transmit the response frame after broadcasting a Multi-STA BA frame, such as the Multi-STA BA frame 2000, to the one or more unassociated STAs. The AP may generate and output for transmission the response frame to each of the one or more unassociated STAs that previously communicated with the AP. For example, the AP may transmit a first response frame to the first STA (which may have previously responded to the AP's trigger frame), and a second response frame to the second STA (which may also have previously responded to the AP's trigger frame). In some implementations, instead of including a broadcast address as the first value in the first RA field, since the response frame may be directed to a single STA, the first RA field of the response frame may indicate a MAC address of the respective STA. In some implementations, the response frame may also include a TRS control field (such as the TRS control field described in FIG. 17). The TRS control field may allocate resources and provides response information to the respective STA so that the STA knows when and where to respond (such as sending an acknowledgement frame). For example, the TRS control field may allocate an RU for the respective STA to use for communications. The TRS control field also may specify a PPDU length, a transmission power, a target RSSI, and modulation coding scheme (MCS). In some implementations, the first frame (such as the response frame described herein) may be included in an RU (such as a broadcast RU) of a DL MU PPDU having a STA ID field set to a value that indicates a broadcast communication with one or more unassociated wireless communication devices. For example, the STA ID field may be set to a value of 2045. In some implementations, the first frame may be included in the DL MU PPDU 1202 shown in FIG. 12, which may include the RU 1210 having the A-MPDU 1214 that may include one or more MPDUs (such as MPDU 1216).

In some implementations, the first frame may be directed to all unassociated STAs in the network, including at least the first STA. For example, the first frame may be a beacon frame, a probe response frame, or a FILS discovery frame. The first RA field in the first MPDU may be set to a broadcast address to indicate the frame is directed to all unassociated STAs in the network. In some implementations, the first frame (such as the beacon frame, probe response frame, or a FILS discovery frame described herein) may be included in an RU (such as a broadcast RU) of a DL MU PPDU having a STA ID field set to a value that indicates a broadcast communication with all unassociated wireless communication devices. For example, the STA ID field may be set to a value of 2045. In some implementations, the first frame may be included in the DL MU PPDU 1202 shown in FIG. 12, which may include the RU 1210 having the A-MPDU 1214 that may include one or more MPDUs (such as MPDU 1216).

Figure 19:
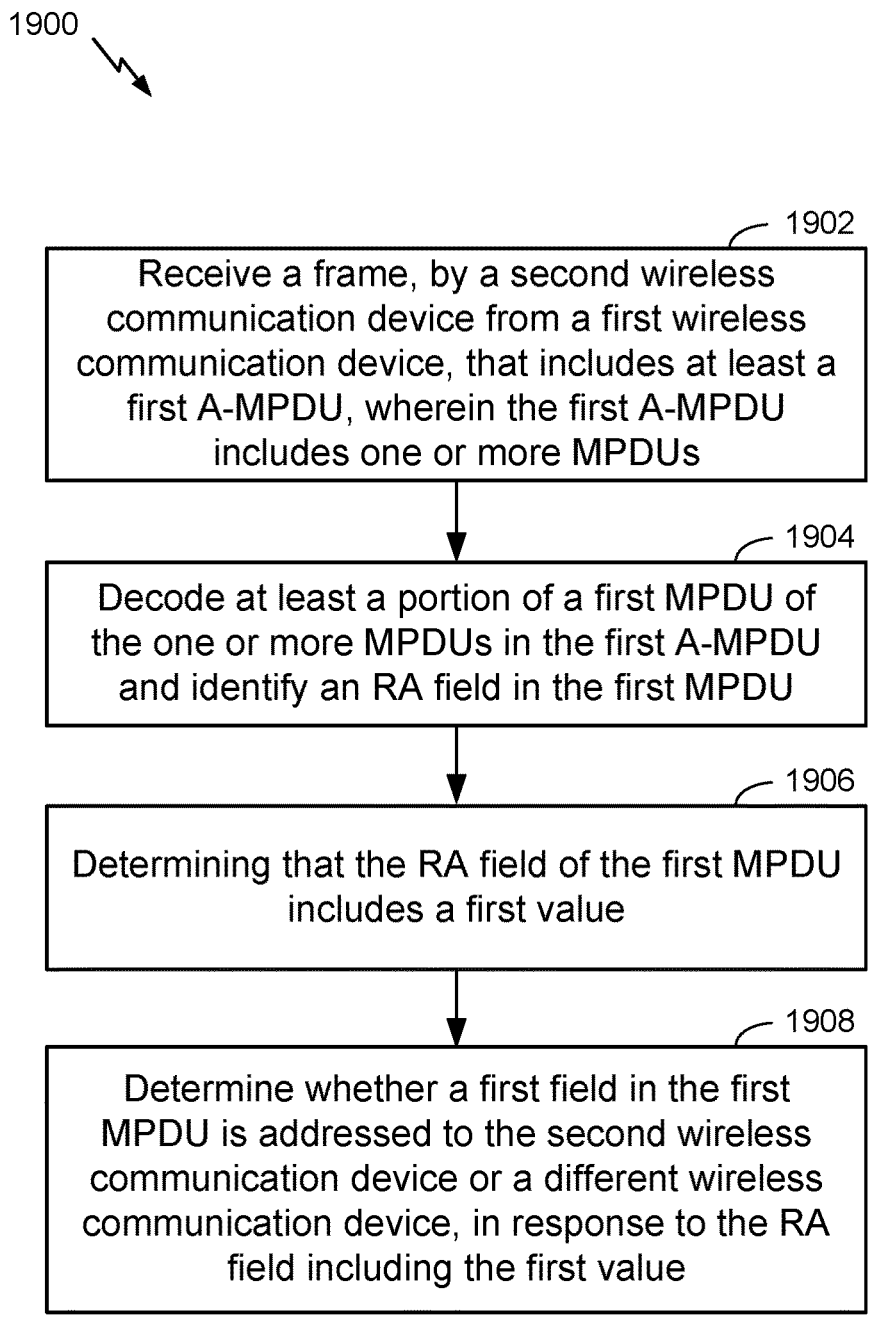
FIG. 19 a flow diagram illustrating an example of a process for processing an incoming aggregated data unit that communicates with one or more unassociated STAs.

FIG. 19 is a flow diagram illustrating an example of a process 1900 for processing an incoming aggregated data unit that communicates with one or more unassociated STAs. In process 1900, a wireless communication device may receive a first frame that includes an aggregated data unit from a second device. The wireless communication device may be a STA (when receiving the frame from an AP or another STA) or an AP (when receiving the frame from a STA or another AP). Note that for the remainder of the description of this flow diagram, a STA (e.g., STA 115 of FIG. 4) will be described as the wireless communication device receiving and processing the first frame, although the first frame may be received by an AP (e.g., AP 105 of FIG. 3) in other implementations.

In some implementations, process 1900 begins at a point in the sequence when the STA has already (1) received a trigger frame from an AP allocating one or more RUs for random access communications; and (2) sent a trigger-based message to the AP on the allocated RU in response to the trigger frame. Thus, process 1900 starts when the STA receives a downlink response to the trigger-based message sent by the STA. Other implementations may use the techniques of FIG. 19 in other contexts. In one implementation, the process 1900 of FIG. 19 is the station-side counterpart to the AP-side process 1800 of FIG. 18. For example, in process 1900 the actions are performed by a STA receiving and processing an incoming MU PPDU formatted by an AP according to the process 1800 of FIG. 18.

At block 1902, a STA (also referred to as a second wireless communication device) receives a first frame from a second device, such an AP (also referred to as a first wireless communication device). The first frame may include at least a first A-MPDU, and the first A-MPDU may include one or more MPDUs.

At block 1904, the STA decodes at least a portion of a first MPDU of the one or more MPDUs in the first A-MPDU and identifies an RA field in the first MPDU.

At block 1906, the STA determines that the RA field of the first MPDU includes a first value. In some implementations, the first value may be a broadcast address.

At block 1908, the STA determines whether a first field in the first MPDU is addressed to the STA or a different device, in response to determining the RA field includes the first value. In some implementations, in response to determining the RA field includes the first value and determining the first field is addressed to the STA, the STA processes information associated with the first field that is directed to the STA. In response to determining the RA field includes the first value and determining the first field is not addressed to the STA (and instead the first field is addressed to a different device), the STA determines whether a second field in the first MPDU is addressed to the STA or a different device. In response to determining the RA field includes the first value and determining the second field is addressed to the STA, the STA processes information associated with the second field that is directed to the STA.

In some implementations, the first frame is a Multi-STA BA frame. The first field may include a first RA subfield having a second value, and the second field may include a second RA subfield having a third value. The STA may determine that the first field is addressed to the STA in response to determining that the second value is a first MAC address associated with the STA. The STA may determine that the second field is addressed to the STA in response to determining that the third value is the first MAC address associated with the STA.

In some implementations, the first frame may include the first field in the first MPDU having a second value, and the first frame may include a second field in a second MPDU having a third value. For example, as described in FIGS. 7 and 8, the first field of the first MPDU may be a first address 4 field and the second field of the second MPDU may be a second address 4 field. As another example, as described in FIGS. 5 and 6, the first field of the first MPDU may be a first RA field and the second field of the second MPDU may be a second RA field.

In some implementations, the first frame that is received by the STA may be a unicast Multi-STA BA frame that is be directed to a single STA. In a unicast Multi-STA BA frame, the first value of the first RA field may be the same as the second value of the first field of the first MPDU. For example, both the first RA and the first field of the first MPDU may be set to a MAC address associated with the STA. In some implementations, the first RA field may be set to a broadcast address, and the first field of the first MPDU may be set to the MAC address associated with the STA.

In some implementations, the STA may receive a second frame from the AP after receiving the first frame (such as the Multi-STA BA frame). The second frame may include a second RA field that indicates a MAC address of the STA. The second frame also may include a triggered response scheduling (TRS) control field that allocates resources and provides response information to the STA. The second frame may be a response frame (such as a Probe Response Frame, a (re)association response, an authentication response, etc.). In some implementations, instead of including a broadcast address in the RA field of the response frame, since the response frame may be directed to a single STA, the RA field of the response frame may indicate a MAC address of the STA. For example, the TRS control field may allocate an RU for the STA to use for communications (such as sending an acknowledgement frame to the AP). The TRS control field also may specify a PPDU length, a transmission power, a target RSSI, and modulation coding scheme (MCS) that the STA can use for communications with the AP.

In some implementations, the first frame received by the STA may be a frame that is directed to all unassociated STAs in the network, including at least the STA. For example, the first frame may be a beacon frame, a probe response frame, or a FILS discovery frame. The first RA field in the first MPDU may be set to a broadcast address to indicate the frame is directed to all unassociated STAs in the network.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on. Furthermore, although certain aspects may be described or claimed in the singular, the plural is contemplated unless limitation to the singular is explicitly stated.

What is claimed is:

1. A method for wireless communication, comprising:
   receiving a first message, by a second wireless communication device from a first wireless communication device, that includes at least a first aggregated media access control protocol data unit (A-MPDU), wherein the first A-MPDU includes one or more media access control protocol data units (MPDUs);
identifying a first recipient address (RA) field in the first MPDU, the first RA field of the first MPDU including a first value;
determining whether a first field in the first MPDU is addressed to the second wireless communication device or a different wireless communication device, in response to the first RA field including the first value; and
in response to the first RA field including the first value and the first field not being addressed to the second wireless communication device, determining whether a second field in the first MPDU is addressed to the second wireless communication device or a different wireless communication device.

2. The method of claim 1, further comprising:
in response to the first RA field including the first value and the first field being addressed to the second wireless communication device, processing information associated with the first field that is directed to the second wireless communication device.

3. The method of claim 1, further comprising:
in response to the first RA field including the first value and the second field being addressed to the second wireless communication device, processing information associated with the second field that is directed to the second wireless communication device.

4. The method of claim 1, wherein the first message is a Multi-Station (Multi-STA) BlockAck (BA) frame, wherein the first field includes a first RA subfield having a second value and the second field includes a second RA subfield having a third value, and wherein determining that the first field is addressed to the second wireless communication device is responsive to determining that the second value is a first media access control (MAC) address associated with the second wireless communication device.

5. The method of claim 1, wherein the first message is a Multi-STA BA frame, wherein the first field includes a first RA subfield having a second value and the second field includes a second RA subfield having a third value, and wherein determining that the second field is addressed to the second wireless communication device is responsive to determining that the third value is a first MAC address associated with the second wireless communication device.

6. The method of claim 1, further comprising:
receiving a second message after receiving the first message, the second message including
a second RA field that indicates a MAC address of the second wireless communication device, and
a triggered response scheduling (TRS) control field that allocates resources and provides response information to the second wireless communication device.

7. The method of claim 1, wherein the first message includes the first field in the first MPDU having a second value and the first message includes a second field in a second MPDU having a third value, wherein the first field of the first MPDU is a first address 4 field and the second field of the second MPDU is a second address 4 field, and wherein determining that the first field is addressed to the second wireless communication device is responsive to determining that the second value is a first MAC address associated with the second wireless communication device.

8. The method of claim 7, further comprising:
determining that the first field of the first MPDU is addressed to the second wireless communication device;
identifying a TRS control field in the first message that assigns a resource unit to the second wireless communication device; and
outputting a response frame for transmission to the first wireless communication device in the assigned resource unit.

9. The method of claim 7, further comprising:
determining that the first field of the first MPDU is addressed to the second wireless communication device;
identifying a trigger frame positioned after the first MPDU in the first A-MPDU;
determining that the trigger frame is allocating a resource unit for the second wireless communication device, and not a different wireless communication device, based on the trigger frame being positioned after the first MPDU in the first A-MPDU; and
outputting a response frame for transmission to the first wireless communication device in the assigned resource unit.

10. The method of claim 1, wherein the first message includes the first field in the first MPDU having a second value and the first message includes a second field in a second MPDU having a third value, wherein the first field of the first MPDU is a first address 4 field and the second field of the second MPDU is a second address 4 field, and wherein determining that the second field is addressed to the second wireless communication device is responsive to determining that the third value is the first MAC address associated with the second wireless communication device.

11. A wireless communication apparatus of a second wireless communication device, comprising:
a receiver configured to:
receive a first message, from a first wireless communication device, that includes at least a first aggregated media access control protocol data unit (A-MPDU), wherein the first A-MPDU includes one or more media access control protocol data units (MPDUs); and
a processor coupled with the receiver, the processor configured to:
identify a first recipient address (RA) field in the first MPDU, the first RA field of the first MPDU including a first value
determine whether a first field in the first MPDU is addressed to the second wireless communication device or a different wireless communication device, in response to the first RA field including the first value, and
determine whether a second field in the first MPDU is addressed to the second wireless communication device or a different wireless communication device, in response to the first RA field including the first value and the first field not being addressed to the second wireless communication device.

12. The wireless communication apparatus of claim 11, wherein the processor is further configured to:
process information associated with the first field that is directed to the second wireless communication device, in response to the first RA field including the first value and the first field being addressed to the second wireless communication device.

13. The wireless communication apparatus of claim 11, wherein the processor is further configured to:
process information associated with the second field that is directed to the second wireless communication device, in response the first RA field including the first value and the second field being addressed to the second wireless communication device.

14. The wireless communication apparatus of claim 11, wherein the first message is a Multi-Station (Multi-STA) BlockAck (BA) frame, wherein the first field includes a first RA subfield having a second value and the second field includes a second RA subfield having a third value, and wherein a determination that the first field is addressed to the second wireless communication device is responsive to a determination that the second value is a first media access control (MAC) address associated with the second wireless communication device.

15. The wireless communication apparatus of claim 11, wherein the first message is a Multi-STA BA frame, wherein the first field includes a first RA subfield having a second value and the second field includes a second RA subfield having a third value, and wherein a determination that the second field is addressed to the second wireless communication device is responsive to a determination that the third value is a first MAC address associated with the second wireless communication device.

16. A wireless communication apparatus for wireless communication, comprising:
    means for receiving a first message, by a second wireless communication device from a first wireless communication device, that includes at least a first aggregated media access control protocol data unit (A-MPDU), wherein the first A-MPDU includes one or more media access control protocol data units (MPDUs);
    means for identifying a first recipient address (RA) field in the first MPDU, the first RA field of the first MPDU including a first value;
    means for determining whether a first field in the first MPDU is addressed to the second wireless communication device or a different wireless communication device, in response to the first RA field including the first value; and
    means for determining whether a second field in the first MPDU is addressed to the second wireless communication device or a different wireless communication device in response to the first RA field including the first value and the first field not being addressed to the second wireless communication device.

17. The wireless communication apparatus of claim 16, further comprising:
    means for processing information associated with the first field that is directed to the second wireless communication device in response to the first RA field including the first value and the first field being addressed to the second wireless communication device.

18. The wireless communication apparatus of claim 16, further comprising:
    means for processing information associated with the second field that is directed to the second wireless communication device in response to the first RA field including the first value and the second field being addressed to the second wireless communication device.

19. The wireless communication apparatus of claim 16, wherein the first message is a Multi-Station (Multi-STA) BlockAck (BA) frame, wherein the first field includes a first RA subfield having a second value and the second field includes a second RA subfield having a third value, and wherein means for determining that the first field is addressed to the second wireless communication device includes means for determining that the second value is a first media access control (MAC) address associated with the second wireless communication device.

20. The wireless communication apparatus of claim 16, wherein the first message is a Multi-STA BA frame, wherein the first field includes a first RA subfield having a second value and the second field includes a second RA subfield having a third value, and wherein means for determining that the second field is addressed to the second wireless communication device includes means for determining that the third value is a first MAC address associated with the second wireless communication device.

\* \* \* \* \*